(12) United States Patent
Kim et al.

(10) Patent No.: US 10,821,951 B2
(45) Date of Patent: Nov. 3, 2020

(54) ELECTRIC BRAKE SYSTEM

(71) Applicant: MANDO CORPORATION, Gyeonggi-do (KR)

(72) Inventors: Hyun-Ho Kim, Gyeonggi-do (KR); Seong-Ho Choi, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 16 days.

(21) Appl. No.: 15/936,347

(22) Filed: Mar. 26, 2018

(65) Prior Publication Data

US 2018/0273008 A1 Sep. 27, 2018

(30) Foreign Application Priority Data

Mar. 27, 2017 (KR) .......................... 10-2017-0038368

(51) Int. Cl.
*B60T 13/68* (2006.01)
*B60T 13/58* (2006.01)
(Continued)

(52) U.S. Cl.
CPC .............. *B60T 13/58* (2013.01); *B60T 7/042* (2013.01); *B60T 7/06* (2013.01); *B60T 8/17* (2013.01);
(Continued)

(58) Field of Classification Search
CPC ...... B60T 13/686; B60T 13/662; B60T 7/042; B60T 13/745; B60T 8/4081;
(Continued)

(56) References Cited

U.S. PATENT DOCUMENTS

2001/0006305 A1* 7/2001 Nakamura ............... B60T 8/321
303/11
2001/0006308 A1* 7/2001 Kawahata ............... B60T 8/367
303/122
(Continued)

FOREIGN PATENT DOCUMENTS

CN 103038110 4/2013
CN 103492247 1/2014
(Continued)

OTHER PUBLICATIONS

Office Action dated Aug. 19, 2019 for Chinese Patent Application No. 201810255994.X and its English machine translation by Google Translate.

*Primary Examiner* — Bradley T King
*Assistant Examiner* — Stephen M Bowes
(74) *Attorney, Agent, or Firm* — Ladas & Parry, LLP

(57) ABSTRACT

An electronic brake system includes a master cylinder connected to a reservoir, the master cylinder including first and second master chambers and first and second pistons provided in the master chambers; a hydraulic pressure supply device activated by an electrical signal to generate a hydraulic pressure; a hydraulic pressure control unit configured to transfer, to a plurality of wheel cylinder provided in wheels, a hydraulic pressure discharged from the hydraulic pressure supply device; first and second backup flow paths configured to connect the first and second master chambers to the hydraulic pressure control unit; and first and second cut valves configured to selectively open and close the first and second backup flow paths, wherein one or both of the first backup flow path and the second backup flow path are connected to the first or second master chamber and any one of the plurality of wheel cylinders.

16 Claims, 7 Drawing Sheets

(51) Int. Cl.
*B60T 7/06* (2006.01)
*B60T 8/17* (2006.01)
*B60T 13/74* (2006.01)
*B60T 17/22* (2006.01)
*B60T 15/02* (2006.01)
*B60T 7/04* (2006.01)
*B60T 13/14* (2006.01)
*B60T 13/66* (2006.01)

(52) U.S. Cl.
CPC .......... *B60T 13/146* (2013.01); *B60T 13/588* (2013.01); *B60T 13/662* (2013.01); *B60T 13/686* (2013.01); *B60T 13/745* (2013.01); *B60T 15/028* (2013.01); *B60T 17/22* (2013.01); *B60T 2270/402* (2013.01); *B60T 2270/404* (2013.01); *B60T 2270/82* (2013.01)

(58) Field of Classification Search
CPC . B60T 8/4013; B60T 8/88; B60T 8/92; B60T 2270/402; B60T 2270/403; B60T 2270/404
See application file for complete search history.

(56) References Cited

U.S. PATENT DOCUMENTS

| | | | | |
|---|---|---|---|---|
| 2004/0245850 | A1* | 12/2004 | Sakai | B60T 8/1766 303/113.4 |
| 2007/0132310 | A1* | 6/2007 | Yamamoto | B60T 8/4036 303/122 |
| 2010/0131151 | A1* | 5/2010 | Izumikawa | B60T 7/042 701/29.2 |
| 2011/0175436 | A1* | 7/2011 | Nakata | B60T 8/4081 303/6.01 |
| 2012/0212044 | A1* | 8/2012 | Nakamura | B60T 7/042 303/9.62 |
| 2013/0213025 | A1 | 8/2013 | Linden | |
| 2014/0152085 | A1* | 6/2014 | Biller | B60T 8/4081 303/10 |
| 2015/0091369 | A1* | 4/2015 | Yamasaki | B60T 13/662 303/10 |
| 2015/0108829 | A1* | 4/2015 | Miyazaki | B60T 8/885 303/10 |
| 2016/0167632 | A1* | 6/2016 | Deng | B60T 7/042 701/70 |
| 2016/0339882 | A1* | 11/2016 | Brenndoerfer | B60T 8/4081 |
| 2017/0050629 | A1* | 2/2017 | Kim | B60T 8/4081 |
| 2017/0072919 | A1* | 3/2017 | Jeon | B60T 8/4081 |
| 2017/0072928 | A1* | 3/2017 | Kim | B60T 8/4081 |
| 2017/0144643 | A1* | 5/2017 | Kim | B60T 7/042 |

FOREIGN PATENT DOCUMENTS

| | | |
|---|---|---|
| CN | 105691370 | 6/2016 |
| CN | 106515697 | 3/2017 |
| DE | 10 2012 221 346 | 6/2014 |
| DE | 102014225958 | 6/2016 |
| EP | 2 520 473 | 11/2012 |

\* cited by examiner

ELECTRIC BRAKE SYSTEM

CROSS-REFERENCE TO RELATED APPLICATION

This application claims the priority to Korean Patent Application No. 10-2017-0038368, filed on Mar. 27, 2017 in the Korean Intellectual Property Office, the disclosure of which is incorporated herein by reference in its entirety.

BACKGROUND

1. Field

Embodiments of the present disclosure relate to an electronic brake system, and more particularly, to an electronic brake system that generates a braking force by using an electrical signal corresponding to a displacement of a brake pedal.

2. Description of the Related Art

A vehicle is necessarily equipped with a brake system for braking the vehicle. Lately, several kinds of systems for obtaining a strong and stable braking force are being proposed.

Examples of brake systems include an anti-lock brake system (ABS) for preventing wheels from sliding while braking, a brake traction control system (BTCS) for preventing driving wheels from slipping upon a sudden unintended acceleration or a sudden acceleration of a vehicle, and an electronic stability control system (ESC) for stably maintaining the travel of a vehicle by controlling brake hydraulic pressure in combination with ABS and BTCS Generally, an electronic brake system includes a hydraulic pressure supply device configured to receive a driver's braking intent in the form of an electrical signal from a pedal displacement sensor configured to sense a displacement of a brake pedal and then supply a pressure to a wheel cylinder when the driver steps on the brake pedal.

An electronic brake system provided with such a hydraulic pressure supply device is disclosed in European Patent No. EP 2 520 473. According to the disclosed document, the hydraulic pressure supply device is configured such that a motor operates according to a pedal effort of a brake pedal to generate a braking pressure. At this point, the braking pressure is generated by converting a rotational force of the motor into a linear motion to press a piston.

SUMMARY

In accordance with one aspect of the present disclosure, an electronic brake system includes a master cylinder connected to a reservoir in which brake fluid is stored and configured to discharge the brake fluid according to a pedal effort of a brake pedal, the master cylinder including first and second master chambers and first and second pistons provided in the master chambers; a hydraulic pressure supply device activated by an electrical signal to generate a hydraulic pressure; a hydraulic pressure control unit configured to transfer, to a plurality of wheel cylinders provided in wheels, a hydraulic pressure discharged from the hydraulic pressure supply device; a first backup flow path configured to connect the first master chamber to the hydraulic pressure control unit; a second backup flow path configured to connect the second master chamber to the hydraulic pressure control unit; a first cut valve configured to selectively open and close the first backup flow path; and a second cut valve configured to selectively open and close the second backup flow path, wherein one or both of the first backup flow path and the second backup flow path are connected to the first or second master chamber and any one of the plurality of wheel cylinders.

The electronic brake system may further include a plurality of inlet valves installed on an upstream side of the wheel cylinders provided in the wheels and configured to selectively open and close the flow paths, wherein one or both of the first backup flow path and the second backup flow path are connected to the first or second master chamber and a downstream side of any one of the plurality of inlet valves. Also, the electronic brake system may further include a simulation device configured to provide a reaction force corresponding to the pedal effort of the brake pedal, the simulation device including a simulation chamber connected to the master cylinder and configured to house brake fluid; and a simulation valve configured to selectively open and close brake fluid flow flowing into the simulation chamber.

Also, the simulation valve may be installed in a flow path for connecting the first backup flow path to the simulation chamber.

Also, the electronic brake system may further include a pedal displacement sensor configured to output an electrical signal corresponding to a displacement of the brake pedal, wherein the hydraulic pressure supply device is activated by the electrical signal of the pedal displacement sensor.

Also, the hydraulic pressure supply device may generate a hydraulic pressure by means of a piston activated by an output electrical signal corresponding to a displacement of the brake pedal and may include a first pressure chamber provided at one side of the piston, which is movably housed inside a cylinder block, and connected to one or more wheel cylinders, and a second pressure chamber provided at another side of the piston and connected to one or more wheel cylinders. The electronic brake system may further include a first hydraulic flow path communicating with the first pressure chamber; second and third hydraulic flow paths branching from the first hydraulic flow path; a first hydraulic circuit including first and second branch flow paths branching from the second hydraulic flow path and connecting to two wheel cylinders; and a second hydraulic circuit including third and fourth branch flow paths branching from the third hydraulic flow path and connecting to two wheel cylinders.

Also, the plurality of inlet valves may include first to fourth inlet valves installed in the first to fourth branch flow paths to selectively open and close brake fluid flow. The first backup flow path may connect the first master chamber to a downstream side of the first inlet valve, or the second backup flow path may connect the second master chamber to a downstream side of the fourth inlet valve.

Also, the electronic brake system may further include a fourth hydraulic flow path communicating with the second pressure chamber, a fifth hydraulic flow path branching from the fourth hydraulic flow path and joining the second hydraulic flow path, and a sixth hydraulic flow path branching from the fourth hydraulic flow path and joining the third hydraulic flow path.

Also, the hydraulic pressure supply device may include a motor activated by an output electrical signal corresponding to a displacement of the brake pedal, a power converter configured to convert a rotational force of the motor into translational motion, a cylinder block, a piston connected to the power converter and movably housed inside the cylinder block, a first pressure chamber provided at one side of the piston and connected to one or more wheel cylinders, and a second pressure chamber provided at another side of the piston and connected to one or more wheel cylinders. The electronic brake system may include a second hydraulic flow path communicating with the first pressure chamber and configured to provide a hydraulic pressure generated in the first pressure chamber to a wheel cylinder; a third hydraulic flow path communicating with the first pressure chamber and configured to provide a hydraulic pressure generated in the first pressure chamber to a wheel cylinder; a fifth hydraulic flow path communicating with the second pressure chamber, joining the second hydraulic flow path, and configured to provide a hydraulic pressure generated in the second pressure chamber to a wheel cylinder; a seventh hydraulic flow path making the second hydraulic flow path communicate with the third hydraulic flow path to transfer a hydraulic pressure of the wheel cylinder to the first pressure chamber; an eighth hydraulic flow path making the seventh hydraulic flow path communicate with the second hydraulic flow path or the third hydraulic flow path to transfer a hydraulic pressure of the wheel cylinder to the first pressure chamber; a first control valve provided in the second hydraulic flow path and configured to control brake fluid flow; a second control valve provided in the third hydraulic flow path and configured to control brake fluid flow; a third control valve provided in the fifth hydraulic flow path and configured to control brake fluid flow; a fifth control valve provided in the seventh hydraulic flow path or the eighth hydraulic flow path and configured to control brake fluid flow; a first hydraulic circuit including first and second branch flow paths branching from the first hydraulic flow path and connecting to two wheel cylinders, and first and second inlet valves configured to control the first and second branch flow paths; a second hydraulic circuit including third and fourth branch flow paths branching from the second hydraulic flow path and connecting to two wheel cylinders; and an electronic control unit (ECU) configured to control operation of the motor and control operation of the fifth control valve and the first to fourth inlet valves.

The electronic brake system may further include a sixth hydraulic flow path communicating with the second pressure chamber, joining the third hydraulic flow path, and configured to provide the hydraulic pressure generated in the second pressure chamber to a wheel cylinder; and a fourth control valve provided in the sixth hydraulic flow path and configured to control brake fluid flow.

Also, the electronic brake system may further include a reservoir flow path configured to connect the reservoir to the master cylinder; a bypass flow path bypassing the reservoir flow path, and an inspection valve configured to selectively open and close the bypass flow path.

Also, the electronic brake system may further include an electronic control unit configured to control operation of the first and second cut valves, the plurality of inlet valves, and the simulation valve. The electronic control unit may open the first cut valve and close the second cut valve and the simulation valve when the first cut valve is leaking, and a hydraulic pressure generated in the master cylinder by forward movement of the brake pedal may be transferred to any one of the plurality of wheel cylinders along the first backup flow path.

Also, the hydraulic pressure control unit may include first to fourth branch flow paths connected to the wheel cylinders provided in the wheels. The plurality of inlet valves may include first to fourth inlet valves installed in the first to fourth branch flow paths, wherein the electronic control unit may close the first inlet valve installed in the first branch flow path connected to the first backup flow path, and the electronic control unit may open the second to fourth inlet valves so that the hydraulic pressure generated in the hydraulic pressure supply device is transferred to the wheel cylinders through the second to fourth branch flow paths.

Also, the electronic brake system may further include an electronic control unit configured to control operation of the first and second cut valves, the plurality of inlet valves, and the simulation valve, wherein the electronic control unit closes the first cut valve and the simulation valve when the second cut valve is leaking, and a hydraulic pressure generated in the master cylinder by forward movement of the brake pedal may be transferred to any one of the plurality of wheel cylinders along the second backup flow path.

Also, the hydraulic pressure control unit may include first to fourth branch flow paths connected to the wheel cylinders provided in the wheels. The plurality of inlet valves may include first to fourth inlet valves installed in the first to fourth branch flow paths. The electronic control unit may close the fourth inlet valve installed in the fourth branch flow path connected to the second backup flow path. The electronic control unit may open the first to third inlet valves so that the hydraulic pressure generated in the hydraulic pressure supply device is transferred to the wheel cylinders through the first to third branch flow paths.

Also, the electronic brake system may further include an electronic control unit configured to control operation of the first and second cut valves, the plurality of inlet valves, and the simulation valve. The electronic control unit may open the first cut valve and close the second cut valve when the simulation valve is stuck in a closed state. A hydraulic pressure generated in the master cylinder by forward movement of the brake pedal is transferred to any one of the plurality of wheel cylinders along the first backup flow path.

Also, the hydraulic pressure control unit may include first to fourth branch flow paths connected to the wheel cylinders provided in the wheels. The plurality of inlet valves may include first to fourth inlet valves installed in the first to fourth branch flow paths. The electronic control unit may close the first inlet valve installed in the first branch flow path connected to the first backup flow path, and the electronic control unit may open the second to fourth inlet valves so that the hydraulic pressure generated in the hydraulic pressure supply device is transferred to the wheel cylinders through the second to fourth branch flow paths.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
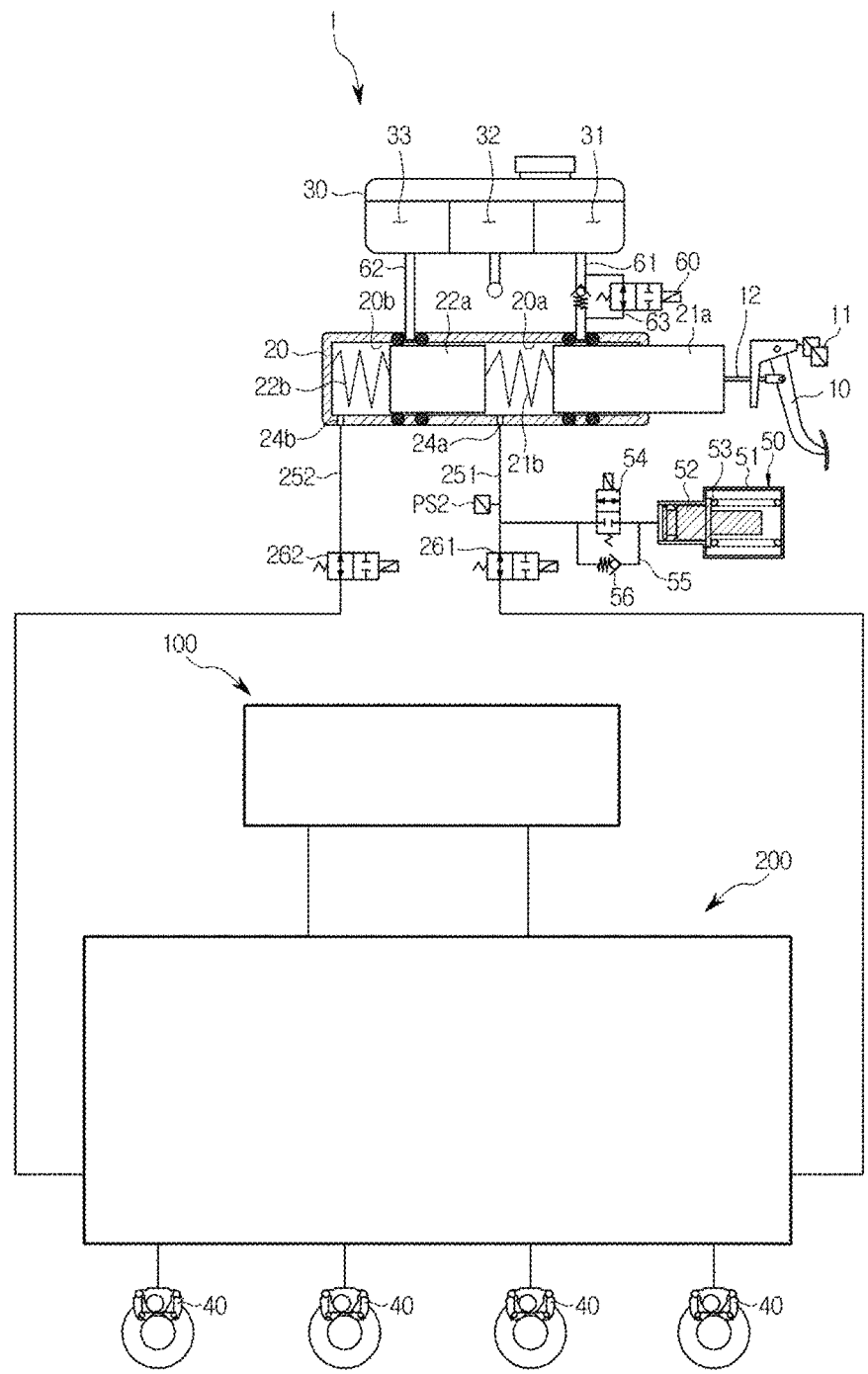
FIG. 1 is a hydraulic circuit diagram showing an electronic brake system according to a first embodiment of the present disclosure.

Hereinafter, embodiments of the present disclosure will be described in detail with reference to the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown, in order to clearly describe the present disclosure, and some elements may be exaggerated to facilitate an understanding of the present disclosure.

FIG. 1 is a hydraulic circuit diagram showing an electronic brake system 1 according to a first embodiment of the present disclosure.

Referring to FIG. 1, the electronic brake system 1 generally includes a master cylinder 20 configured to generate a hydraulic pressure, a reservoir 30 coupled to an upper part of the master cylinder 20 to store brake fluid, e.g., oil, an input rod 12 configured to press the master cylinder 20 according to a pedal effort of a brake pedal 10, wheel cylinders 40 configured to receive the hydraulic pressure and brake wheels RR, RL, FR, and FL, a pedal displacement sensor 11 configured to sense a displacement of the brake pedal 10, a simulation device 50 configured to provide a reaction force corresponding to the pedal effort of the brake pedal 10, a hydraulic pressure supply device 100 configured to receive a braking intent of a driver in the form of an electrical signal from the pedal displacement sensor 11, a hydraulic pressure control unit 200 including first and second hydraulic circuits, each of which is provided in two of the wheels RR, RL, FR, and FL to control hydraulic pressure flow transferred to the wheel cylinders 40, a first backup flow path 251 configured to connect a first master chamber 20a of the master cylinder 20 to any one of the wheel cylinders 40, a second backup flow path 252 configured to connect a second master chamber 20b of the master cylinder 20 to another one of the wheel cylinders 40, a first cut valve 261 provided in the first backup flow path 251 to control hydraulic pressure flow, a second cut valve 262 provided in the second backup flow path 252 to control hydraulic pressure flow, and an electronic control unit (ECU) configured to control the hydraulic pressure supply device 100 and the valves on the basis of hydraulic pressure information and pedal displacement information.

The master cylinder 20 may have at least one chamber to generate a hydraulic pressure. As an example, the master cylinder 20 may have a first master chamber 20a and a second master chamber 20b.

A first piston 21a connected to the input rod 12 is provided in the first master chamber 20a, and a second piston 22a is provided in the second master chamber 20b. Also, the first master chamber 20a communicates with a first hydraulic pressure port so that oil flows through the first hydraulic pressure port, and the second master chamber 20b communicates with a second hydraulic pressure port so that oil flows through the second hydraulic pressure port. As an example, the first hydraulic pressure port may be connected to the first backup flow path 251, and the second hydraulic pressure port may be connected to the second backup flow path 252.

Meanwhile, the master cylinder 20 can ensure safety against failure by having the two master chambers 20a and 20b. For example, a master chamber 20a, which is one of the two master chambers 20a and 20b, may be connected to a front right wheel FR and a rear left wheel RL of a vehicle through the first backup flow path 251, and the other master chamber 20b may be connected to a front left wheel FL and a rear right wheel RR through the second backup flow path 252. By independently configuring the two master chambers 20a and 20b as described above, it is possible to brake a vehicle even when one chamber fails.

Alternatively, unlike that shown in FIG. 1, one of the two master chambers may be connected to the two front wheels FR and FL, and the other master chamber may be connected to the two rear wheels RR and RL. Alternatively, one of the two master chambers may be connected to the front left wheel FL and the rear left wheel RL, and the other chamber may be connected to the front right wheel FR and the rear right wheel RR. That is, the wheels connected to the master chambers of the master cylinder 20 may be placed at various locations.

Also, a first spring 21b may be provided between the first piston 21a and the second piston 22a of the master cylinder 20, and a second spring 22b may be provided between the second piston 22a and an end of the master cylinder 20. That is, the first piston 21a may be housed in the first master chamber 20a, and the second piston 22a may be housed in the second master chamber 20b.

The first spring 21b and the second spring 22b, which move as the displacement of the brake pedal 10 changes, are compressed by the first piston 21a and the second piston 22a, and thus elastic forces are stored in the first spring 21b and the second spring 22b. Also, when a force pushing the first piston 21a becomes smaller than the elastic force, the elastic forces stored in the first and second springs 21b and 22b push and return the first and second pistons 21a and 22a to original states thereof.

Meanwhile, the input rod 12 that presses the first piston 21a of the master cylinder 20 may be brought into contact with the first piston 21a. That is, there may be no gap between the master cylinder 20 and the input rod 12. Accordingly, when the brake pedal 10 is depressed, the master cylinder 20 may be directly pressed without an inoperative portion in the pedal stroke.

Also, the first master chamber 20a may be connected to the reservoir 30 through a first reservoir flow path 61, and the second master chamber 20b may be connected to the reservoir 30 through a second reservoir flow path 62.

Also, the master cylinder 20 may include two sealing members 25a and 25b disposed in front of and behind the first reservoir flow path 61 and two sealing members 25c and 25d disposed in front of and behind the second reservoir flow path 62. The sealing members 25a, 25b, 25c, and 25d may have the form of a ring protruding from an inner wall of the master cylinder 20 or protruding from an outer surface of the piston 21a or 22a.

Also, a check valve 64 that blocks oil from flowing from the first master chamber 20a into the reservoir 30 while allowing oil to flow from the reservoir 30 into the first master chamber 20a may be provided in the first reservoir flow path 61. The check valve 64 may be provided to allow only unidirectional fluid flow.

Also, a front stage and a rear stage of the check valve 64 of the first reservoir flow path 61 may be connected to each other by a bypass flow path 63. Also, an inspection valve 60 may be provided in the bypass flow path 63.

The inspection valve 60 may be provided as a bidirectional control valve for controlling oil flow between the reservoir 30 and the master cylinder 20. Also, the inspection valve 60 may be provided as a normally open solenoid valve, which operates such that the valve is normally open but is closed when a closing signal is received from the ECU.

The simulation device 50 may be connected to the first backup flow path 251, which will be described below, to provide a reaction force in response to the pedal effort of the brake pedal 10. Enough reaction force is provided to compensate for the pedal effort, which is provided by a driver, so that the driver may precisely control the braking force as intended.

The simulation device 50 includes a pedal simulator having a simulation chamber 51 configured to store oil flowing out from the first hydraulic port 24a of the master cylinder 20, a reaction force piston 52 provided in the simulation chamber 51, and a reaction force spring 53 configured to elastically support the reaction force piston 52, and a simulator valve (or a SIM valve) 54 connected to a front end of the simulation chamber 51.

The reaction force piston 52 and the reaction force spring 53 may be installed to have a certain range of displacement in the simulation chamber 51 due to oil flowing into the simulation chamber 51.

The reaction force spring 53 shown in FIG. 1 is just an example of an element capable of providing an elastic force to the reaction force piston 52. However, the present disclosure may include various elements capable of storing an elastic force through shape deformation. As an example, the present disclosure includes various members capable of storing an elastic force by being formed of a material such as rubber or by having a coil or plate shape.

The simulator valve 54 may be provided in a flow path that connects the front end of the simulation chamber 51 to the first master chamber 20a of the master cylinder 20. The simulator valve 54 may be configured as a normally closed solenoid valve, which is normally kept closed. When a driver applies a pedal effort to the brake pedal 10, the simulator valve 54 may be opened to transfer oil stored in the master chamber 20a to the simulation chamber 51.

Also, a front stage and a rear stage of the simulator valve 54 may be connected to each other by a bypass flow path 55, and a check valve 56 may be provided in the bypass flow path 55. The check valve 56 may block oil from flowing from the first backup flow path 251 into the pedal simulator while allowing oil to flow from the pedal simulator into the first backup flow path 251.

The operation of the simulation device 50 will be described below. When a driver provides a pedal effort to the brake pedal 10, the oil stored in the first master chamber 20a flows into the simulation chamber 51 through the simulator valve 54, and the reaction force piston 52 of the pedal simulator compresses the reaction force spring 53. In this process, the driver is provided with a pedal feel. Also, when the driver releases the pedal effort from the brake pedal 10, the reaction force spring 53 pushes the reaction force piston 52, and thus the reaction force piston 52 returns to an original state thereof. In this case, the oil of the simulation chamber 51 flows back into the first master chamber 20a through a flow path in which the simulator valve 54 is installed. Also, the oil of the simulation chamber 51 may flow back into the first master chamber 20a through the bypass flow path 55 in which the check valve 56 is installed. Thus, even when the driver quickly releases the pedal effort of the brake pedal 10, the oil of the simulation chamber 51 may rapidly flow into the first master chamber 20a. The hydraulic pressure supply device 100 may be provided to provide a hydraulic pressure transferred to the wheel cylinders 40, and the hydraulic pressure control unit 200 may receive a hydraulic pressure from the hydraulic pressure supply device 100 and controls a hydraulic pressure transferred to two wheel cylinders. To this end, the hydraulic pressure supply device 100 may be configured in various ways and by means of devices having various structures to form a hydraulic pressure of brake oil, and the hydraulic pressure control unit 200 may include a plurality of flow paths and valves. The hydraulic pressure supply device 100 and the hydraulic pressure control unit 200 will be described below with reference to FIGS. 2 and 3.

The first and second backup flow paths 251 and 252 are provided to directly supply oil discharged from the master cylinder 20 to the wheel cylinder 40 when the electronic brake system 1 operates abnormally. A mode in which the hydraulic pressure of the master cylinder 20 is directly transferred to the wheel cylinder 40 is referred to as a fallback mode.

A first cut valve 261 configured to control oil flow may be provided in the first backup flow path 251, and a second cut valve 262 configured to control oil flow may be provided in the second backup flow path 252. Also, the first backup flow path 251 may connect the first master chamber 20a to any one of the wheel cylinders 40, and the second backup flow path 252 may connect the second master chamber 20b to another one of the wheel cylinders 40.

Also, each of the first and second cut valves 261 and 262 may be provided as a normally open solenoid valve, which operates such that the valve is normally open but is closed when a closing signal is received from the ECU.

When the electronic brake system 1 operates normally, the pedal displacement sensor 11 senses a displacement of the brake pedal 10 caused by a driver, and the hydraulic pressure supply device 100 is activated by an electrical signal. Also, a hydraulic pressure formed in the hydraulic pressure supply device 100 may be controlled by the hydraulic pressure control unit 200, and thus a braking force may be stably formed in all of the wheel cylinders 40.

However, when an abnormal condition in which the first cut valve 261 or the second cut valve 262 is leaking occurs, the ECU keeps a leaking cut valve open and closes a normal cut valve. As an example, when the first cut valve 261 is leaking, the ECU keeps the first cut valve 261 open and closes the second cut valve 262. Meanwhile, the first backup flow path 251 connects the first master chamber 20a to any one of the wheel cylinders 40, and thus a hydraulic pressure formed in the first master chamber 20a by the pedal effort of the brake pedal 10 is transferred to the connected wheel cylinder 40 along the first backup flow path 251. Also, the hydraulic pressure supply device 100 is activated by an electrical signal of the pedal displacement sensor 11 caused by a displacement of the brake pedal 10, and a hydraulic pressure formed in the hydraulic pressure supply device 100 is, to form a braking force, transferred via the hydraulic pressure control unit 200 to a wheel cylinder 40 not connected to the first backup flow path 251. Thereby, it is possible to form braking forces for all of the four wheel cylinders 40.

It is the same with the other case. When the second cut valve 262 is leaking, the ECU keeps the second cut valve 262 open and closes the first cut valve 261. Meanwhile, the second backup flow path 252 connects the second master chamber 20b to any one of the wheel cylinders 40, and thus a hydraulic pressure formed in the second master chamber 20b by the pedal effort of the brake pedal 10 is transferred to the connected wheel cylinder 40 along the second backup flow path 252. Also, the hydraulic pressure supply device 100 is activated by an electrical signal of the pedal displacement sensor 11 caused by a displacement of the brake pedal 10, and a hydraulic pressure formed in the hydraulic pressure supply device 100 is, to form a braking force, transferred via the hydraulic pressure control unit 200 to a wheel cylinder 40 not connected to the second backup flow path 252. Thereby, it is possible to form braking forces for all of the four wheel cylinders 40.

The electronic brake system 1 according to the first embodiment of the present disclosure will be described below in detail.

Figure 2:
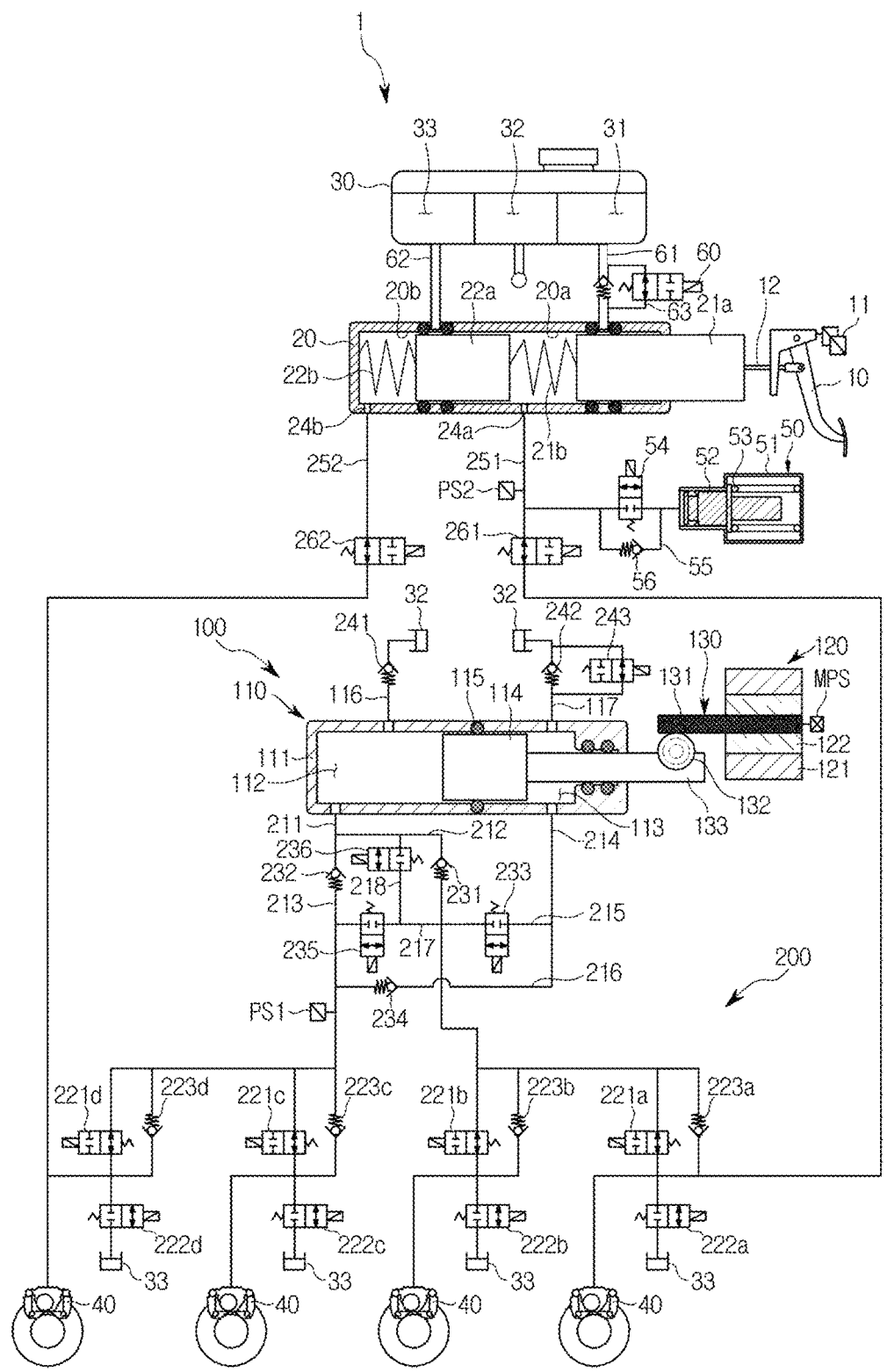
FIG. 2 is a hydraulic circuit diagram showing a non-braking state of the electronic brake system according to the first embodiment.

FIG. 2 is a hydraulic circuit diagram showing a non-braking state of the electronic brake system 1 according to the first embodiment. Referring to FIG. 2, the hydraulic pressure supply device 100 may include a hydraulic pressure providing unit 110 configured to provide an oil pressure transferred to a wheel cylinder 40, a motor 120 configured to generate a rotational force by using an electrical signal of a pedal displacement sensor 11, and a power converter 130 configured to convert a rotational motion of the motor 120 into a linear motion and transfer the linear motion to the hydraulic pressure providing unit 110. Alternatively, the hydraulic pressure providing unit 110 may be activated not by a driving force supplied by the motor but by a pressure provided by a high-pressure accumulator.

Figure 3:
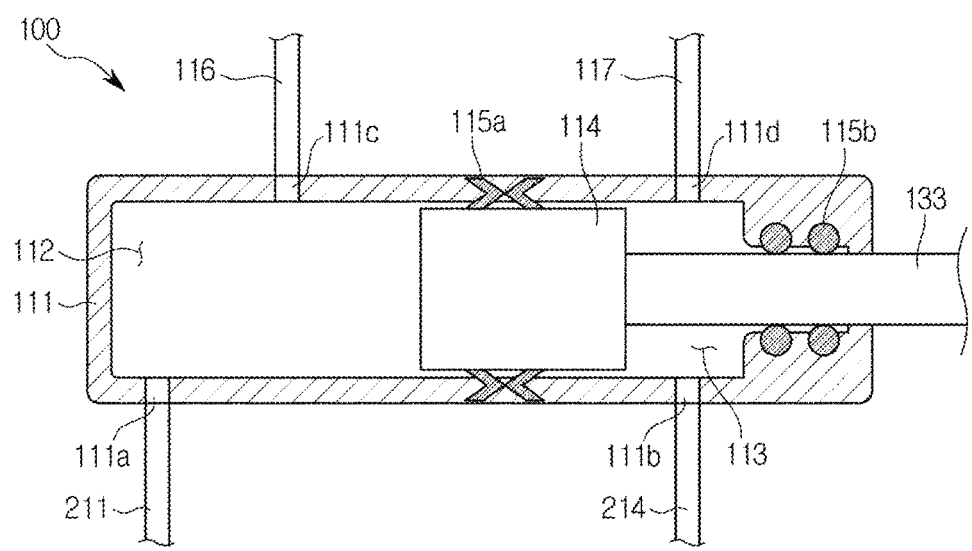
FIG. 3 is an enlarged diagram showing a hydraulic pressure providing unit according to the first embodiment of the present disclosure.

Subsequently, the hydraulic pressure providing unit 110 according to the first embodiment of the present disclosure will be described with reference to FIG. 3. FIG. 3 is an enlarged diagram showing the hydraulic pressure providing unit 110 according to the first embodiment of the present disclosure.

The hydraulic pressure providing unit 110 includes a cylinder block 111 in which a pressure chamber configured to receive and store oil is formed, a hydraulic piston 114 housed in the cylinder block 111, sealing members 115 (115a and 115b) provided between the hydraulic piston 114 and the cylinder block 111 to seal the pressure chamber, and a driving shaft 133 connected to a rear end of the hydraulic piston 114 to transfer, to the hydraulic piston 114, power output by a power converter 130.

The pressure chamber may include a first pressure chamber 112 located in front of (in the front direction of) the hydraulic piston 114 (on the left with respect to the drawing) and a second pressure chamber 113 located behind (in the rear direction of) the hydraulic piston 114 (on the right with respect to the drawing). That is, the first pressure chamber 112 is divided by front ends of the cylinder block 111 and the hydraulic piston 114 and provided to have a volume changing according to the movement of the hydraulic piston 114, and the second pressure chamber 113 is divided by rear ends of the cylinder block 111 and the hydraulic piston 114 and provided to have a volume changing according to the movement of the hydraulic piston 114.

The first pressure chamber 112 is connected to a first hydraulic flow path 211 through a first communication hole 111a formed behind the cylinder block 111 and is connected to a fourth hydraulic flow path 214 through a second communication hole 11b formed in front of the cylinder block 111. The first hydraulic flow path 211 connects the first pressure chamber 112 to first and second hydraulic circuits. Also, the first hydraulic flow path 211 branches into a second hydraulic flow path 212 communicating with the first hydraulic circuit and a third hydraulic flow path 213 communicating with the second hydraulic circuit. The fourth hydraulic flow path 214 connects the second pressure chamber 113 to the first and second hydraulic circuits. Also, the fourth hydraulic flow path 214 branches into a fifth hydraulic flow path 215 communicating with the first hydraulic circuit and a sixth hydraulic flow path 216 communicating with the second hydraulic circuit.

The sealing member 115 includes a piston sealing member 115a provided between the hydraulic piston 114 and the cylinder block 111 to seal a gap between the first pressure chamber 112 and the second pressure chamber 113 and a driving shaft sealing member 115b provided between the driving shaft 133 and the cylinder block 111 to seal a gap between the second pressure chamber 113 and the cylinder block 111. The piston sealing member 115a may prevent oil from leaking from the first pressure chamber 112 into the second pressure chamber 113 and also may prevent oil from leaking from the second pressure chamber 113 into the first pressure chamber 112. That is, a hydraulic pressure or a negative pressure of the first pressure chamber 112 generated by a forward or backward movement of the hydraulic piston 114 may be blocked by the piston sealing member 115a so that the hydraulic pressure or the negative pressure may be transferred to the first and fourth hydraulic flow paths 211 and 214 without leaking into the second pressure chamber 113. Also, a hydraulic pressure or a negative pressure of the second pressure chamber 113 generated by a forward or backward movement of the hydraulic piston 114 may be blocked by the driving shaft sealing member 115b so that the hydraulic pressure or the negative pressure may not leak into the cylinder block 111.

The first and second pressure chambers 112 and 113 may be connected to the reservoir 30 through dump flow paths 116 and 117, respectively, to receive oil from the reservoir 30 and then store the received oil or to transfer oil of the first pressure chamber 112 or the second pressure chamber 113 to the reservoir 30. As an example, the dump flow paths 116 and 117 may include a first dump flow path 116 branching from the first pressure chamber 112 and connecting to the reservoir 30 and a second dump flow path 117 branching from the second pressure chamber 113 and connecting to the reservoir 30.

Also, the first pressure chamber 112 may be connected to the first dump flow path 116 through a fifth communication hole 111f formed in front of the first pressure chamber 112, and the second pressure chamber 113 may be connected to the second dump flow path 117 through a sixth communication hole 111ɜ formed behind the second pressure chamber 113.

Also, the first communication hole 111a communicating with the first hydraulic flow path 211 may be formed in front of the first pressure chamber 112, and the second communication hole 111b communicating with the fourth hydraulic flow path 214 may be formed behind the first pressure chamber 112. Also, a third communication hole 111c communicating with the first dump flow path 116 may be formed in the first pressure chamber 112.

Also, a third communication hole 111c communicating with the third hydraulic flow path 213 and a fourth communication hole 111d communicating with the second dump flow path 117 may be formed in the second pressure chamber 113.

The flow paths 211, 212, 213, 214, 215, 216, 217, and 218 and the valves 231, 232, 233, 234, 235, 236, 241, 242, and 243 connected to the first pressure chamber 112 and the second pressure chamber 113 will be described below with reference to FIG. 2.

The second hydraulic flow path 212 may communicate with the first hydraulic circuit, and the third hydraulic flow path 213 may communicate with the second hydraulic circuit. Accordingly, a hydraulic pressure may be transferred to the first hydraulic circuit and the second hydraulic circuit by a forward movement of the hydraulic piston 114.

As an example, the first hydraulic circuit may include a first branch flow path branching from the second hydraulic flow path 212 and connecting to the wheel cylinder 40 installed in the front right wheel FR and a second branch flow path branching from the second hydraulic flow path 212 and connecting to the wheel cylinder 40 installed in the rear left wheel RL.

Also, the second hydraulic circuit may include a third branch flow path branching from the third hydraulic flow path 213 and connecting to the wheel cylinder 40 installed in the rear right wheel RR and a fourth branch flow path branching from the third hydraulic flow path 213 and connecting to the wheel cylinder 40 installed in the front left wheel FL.

Also, the electronic brake system 1 according to the first embodiment of the present disclosure may include a first control valve 231 and a second control valve 232 provided in the second hydraulic flow path 212 and the third hydraulic flow path 213, respectively, to control oil flow.

Also, each of the first and second control valves 231 and 232 may be provided as a check valve that allows only oil flow in a direction from the first pressure chamber 112 to the first or second hydraulic circuit 201 or 202 and blocks oil flow in the opposite direction. That is, the first control valve 231 or the second control valve 232 may prevent the hydraulic pressure of the first or second hydraulic circuit 201 or 202 from leaking to the first pressure chamber 112 through the second hydraulic flow path 212 or the third hydraulic flow path 213, while allowing the hydraulic pressure of the first pressure chamber 112 to be transferred to the first or second hydraulic circuit 201 or 202.

Meanwhile, the fourth hydraulic flow path 214 may branch into the fifth hydraulic flow path 215 and the sixth hydraulic flow path 216 to communicate with both of the first hydraulic circuit and the second hydraulic circuit. As an example, the fifth hydraulic flow path 215 branching from the fourth hydraulic flow path 214 may communicate with the first hydraulic circuit, and the sixth hydraulic flow path 216 branching from the fourth hydraulic flow path 214 may communicate with the second hydraulic circuit. Accordingly, a hydraulic pressure may be transferred to both of the first hydraulic circuit and the second hydraulic circuit by a backward movement of the hydraulic piston 114.

Also, the electronic brake system 1 according to the first embodiment of the present disclosure may include a third control valve 233 provided in the fifth hydraulic flow path 215 to control oil flow and a fourth control valve 234 provided in the sixth hydraulic flow path 216 to control oil flow.

The third control valve 233 may be provided as a bidirectional control valve for controlling oil flow between the second pressure chamber 113 and the first hydraulic circuit. Also, the third control valve 233 may be provided as a normally closed solenoid valve, which operates such that the valve is normally closed but is opened when an opening signal is received from the ECU.

Also, the fourth control valve 234 may be provided as a check valve that allows only oil flow in a direction from the second pressure chamber 113 to the second hydraulic circuit and blocks oil flow in the opposite direction. That is, the fourth control valve 234 may prevent a hydraulic pressure of the second hydraulic circuit from leaking to the second pressure chamber 113 through the sixth hydraulic flow path 216 and the fourth hydraulic flow path 214.

Also, the electronic brake system 1 according to the first embodiment of the present disclosure may include a fifth control valve 235 provided in a seventh hydraulic flow path 217 for connecting the second hydraulic flow path 212 to the third hydraulic flow path 213 to control oil flow and a sixth control valve 236 provided in an eighth hydraulic flow path 218 for connecting the second hydraulic flow path 212 to the seventh hydraulic flow path 217 to control oil flow. Also, each of the fifth control valve 235 and the sixth control valve 236 may be provided as a normally closed solenoid valve, which operates such that the valve is normally closed but is opened when an opening signal is received from the ECU.

When an abnormality occurs in the first control valve 231 or the second control valve 232, the fifth control valve 235 and the sixth control valve 236 may be opened so that the hydraulic pressure of the first pressure chamber 112 are transferred to both of the first hydraulic circuit and the second hydraulic circuit.

Also, when a hydraulic pressure of the wheel cylinder 40 is taken out and then sent to the first pressure chamber 112, the fifth control valve 235 and the sixth control valve 236 may be opened. This is because each of the first control valve 231 and the second control valve 232 provided in the second hydraulic flow path 212 and the third hydraulic flow path 213 is provided as a check valve for allowing only oil flow in one direction.

Also, the electronic brake system 1 according to the first embodiment of the present disclosure may further include a first dump valve 241 and a second dump valve 242 provided in the first dump flow path 116 and the second dump flow path 117, respectively, to control oil flow. Each of the dump valves 241 and 242 may be a check valve that opens the oil flow only in a direction from the reservoir 30 to the first pressure chamber 112 or the second pressure chamber 113 and closes the oil flow in the opposite direction. That is, the first dump valve 241 may be a check valve that allows oil to flow from the reservoir 30 to the first pressure chamber 112 and blocks oil from flowing from the first pressure chamber 112 to the reservoir 30, and the second dump valve 242 may be a check valve that allows oil to flow from the reservoir 30 to the second pressure chamber 113 and blocks oil from flowing from the second pressure chamber 113 to the reservoir 30.

Also, the second dump flow path 117 may include a bypass flow path, and a third dump valve 243 for controlling oil flow between the second pressure chamber 113 and the reservoir 30 may be installed in the bypass flow path.

The third dump valve 243 may be provided as a solenoid valve for controlling bidirectional flow and may be provided as a normally open solenoid valve, which operates such that the valve is normally open but is closed when a closing signal is received from the ECU.

The hydraulic pressure providing unit 110 of the electronic brake system 1 according to the first embodiment of the present disclosure may operate in a double cylinder manner. That is, a hydraulic pressure generated in the first pressure chamber 112 as the hydraulic piston 114 moves forward may be transferred to the first hydraulic circuit through the first hydraulic flow path 211 and the second hydraulic flow path 212 to activate the wheel cylinders 40 installed in the front right wheel FR and the rear left wheel RL and may be transferred to the second hydraulic circuit through the first hydraulic flow path 211 and the third hydraulic flow path 213 to activate the wheel cylinders 40 installed in the rear right wheel RR and the front left wheel FL.

Likewise, a hydraulic pressure generated in the second pressure chamber 113 as the hydraulic piston 114 moves backward may be transferred to the first hydraulic circuit through the fourth hydraulic flow path 214 and the fifth hydraulic flow path 215 to activate the wheel cylinders 40 installed in the front right wheel FR and the rear left wheel RL and may be transferred to the second hydraulic circuit through the fourth hydraulic flow path 214 and the sixth hydraulic flow path 216 to activate the wheel cylinders 40 installed in the rear right wheel RR and the front left wheel FL.

Also, a negative pressure generated in the first pressure chamber 112 as the hydraulic piston 114 moves backward may suction oil of the wheel cylinders 40 installed in the front right wheel FR and the rear left wheel RL and transfer the oil to the first pressure chamber 112 through the first hydraulic circuit, the second hydraulic flow path 212, and the first hydraulic flow path 211 and may suction oil of the wheel cylinders 40 installed in the rear right wheel RR and the front left wheel FL and transfer the oil to the first pressure chamber through the second hydraulic circuit, the third hydraulic flow path 213, and the first hydraulic flow path 211.

Subsequently, the motor 120 and the power converter 130 of the hydraulic pressure supply device 100 will be described.

The motor 120 is a device configured to generate a rotational force in response to a signal output from the ECU (not shown) and may generate a rotational force in the forward direction or in the reverse direction. A rotational angular velocity and a rotational angle of the motor 120 may be precisely controlled. The motor 120 is based on a well-known technology, and thus detailed description thereof will be omitted.

Meanwhile, the ECU controls the valves 54, 60, 221a, 221b, 221c, 221d, 222a, 222b, 222c, 222d, 233, 235, 236, 243, 261, and 262 provided in the electronic brake system 1 of the present disclosure, which will be described below, as well as the motor 120. An operation of controlling a plurality of valves according to a displacement of the brake pedal 10 will be described below.

A driving force of the motor 120 generates a displacement of the hydraulic piston 114 through the power converter 130, and a hydraulic pressure generated while the hydraulic piston 114 slides in the pressure chamber is transferred to the wheel cylinders 40 installed in the wheels RR, RL, FR, and FL through the first and second hydraulic flow paths 211 and 212.

The power converter 130 is a device configured to convert a rotational force into a linear motion. As an example, the power converter 130 may include a worm shaft 131, a worm wheel 132, and a driving shaft 133.

The worm shaft 131 may be formed as one body with a rotational shaft of the motor 120. The worm shaft 131 has a worm formed on an outer circumferential surface of the worm shaft 131 to mesh with the worm wheel 132 and thus rotates the worm wheel 132. The worm wheel 132 meshes with the driving shaft 133 to linearly move the driving shaft 133, and the driving shaft 133 is connected to the hydraulic piston 114 to slide the hydraulic piston 114 in the cylinder block 111.

In other words, with respect to the above operations, a signal detected by the pedal displacement sensor 11 when a displacement occurs in the brake pedal 10 is transferred to the ECU (not shown), and the ECU drives the motor 120 in one direction to rotate the worm shaft 131 in one direction. The rotational force of the worm shaft 131 is transferred to the driving shaft 133 through the worm wheel 132, and the hydraulic piston 114 connected to the driving shaft 133 moves forward, thus generating a hydraulic pressure in the first pressure chamber 112.

On the contrary, when a pedal effort is removed from the brake pedal 10, the ECU drives the motor 120 in an opposite direction to rotate the worm shaft 131 in an opposite direction. Accordingly, the worm wheel 132 also rotates in an opposite direction, and the hydraulic piston 114 connected to the driving shaft 133 returns (moves backward) to generate a negative pressure in the first pressure chamber 112.

Meanwhile, the hydraulic pressure and the negative pressure may be generated in directions opposite to those described above. In other words, a signal detected by the pedal displacement sensor 11 when a displacement occurs in the brake pedal 10 is transferred to the ECU (not shown), and the ECU drives the motor 120 in the opposite direction to rotate the worm shaft 131 in the opposite direction. The rotational force of the worm shaft 131 is transferred to the driving shaft 133 through the worm wheel 132, and the hydraulic piston 114 connected to the driving shaft 133 moves backward, thus generating a hydraulic pressure in the second pressure chamber 113.

On the contrary, when a pedal effort is removed from the brake pedal 10, the ECU drives the motor 120 in one direction to rotate the worm shaft 131 in one direction. Accordingly, the worm wheel 132 also rotates in the opposite direction, and the hydraulic piston 114 connected to the driving shaft 133 returns (moves forward) to generate a negative pressure in the second pressure chamber 113.

As described above, the hydraulic pressure supply device 100 transfers a hydraulic pressure to the wheel cylinder 40 or suctions a hydraulic pressure and transfers the suctioned hydraulic pressure to the reservoir 30 depending on a rotational direction of the rotational force generated by the motor 120.

When the motor 120 rotates in one direction, a hydraulic pressure may be generated in the first pressure chamber 112 or a negative pressure may be generated in the second pressure chamber 113. In this case, whether braking is performed by the hydraulic pressure or released by the negative pressure may be determined by controlling the valves 54, 60, 221a, 221b, 221c, 221d, 222a, 222b, 222c, 222d, 233, 235, 236, and 243. This will be described in detail later.

Although not shown, the power converter 130 may be composed of a ball screw and a nut assembly, For example, the power converter 130 may be composed of a screw formed with the rotational shaft of the motor 120 as one body and a ball nut screwed with a screw in a limited rotation state to linearly move according to the rotation of the screw. The hydraulic piston 114 is connected to the ball nut of the power converter 130 to press the pressure chamber by using a linear motion of the ball nut. A structure composed of the ball screw and the nut assembly is a device configured to convert a rotational motion into a linear motion and is a well-known technique, and thus detailed description thereof will be omitted.

Also, the power converter 130 according to the first embodiment of the present disclosure can be understood as employing any structure other than the structure composed of the ball screw and the nut assembly, as long as the structure can convert a rotational motion into a linear motion.

Also, subsequently, the hydraulic pressure control unit 200 according to the first embodiment of the present disclosure will be described with reference to FIG. 2.

The hydraulic pressure control unit 200 may include a first hydraulic circuit and a second hydraulic circuit, each of which receives a hydraulic pressure and controls two wheels. As an example, the first hydraulic circuit may control the front right wheel FR and the rear left wheel RL, and the second hydraulic circuit may control the front left wheel FL and the rear right wheel RR. Also, the wheel cylinders are installed in the wheels FR, FL, RR, and RL and configured to receive a hydraulic pressure to brake the wheels FR, FL, RR, and RL.

The first hydraulic circuit connects to the second hydraulic flow path 212 through the first hydraulic flow path 211 to receive a hydraulic pressure from the hydraulic pressure supply device 100, and the second hydraulic flow path 212 branches into two flow paths connected to the front right wheel FR and the rear left wheel RL.

Likewise, the second hydraulic circuit connects to the third hydraulic flow path 213 through the first hydraulic flow path 211 to receive a hydraulic pressure from the hydraulic pressure supply device 100, and the third hydraulic flow path 213 branches into two flow paths connected to the front left wheel FL and the rear right wheel RR.

The hydraulic circuits 201 and 202 may include a plurality of inlet valves 221 (221a, 221b, 221c, and 221d) to control hydraulic pressure flow. As an example, the first hydraulic circuit may have two inlet valves 221a and 221b connected to the first hydraulic flow path 211 and configured to control hydraulic pressures transferred to two wheel cylinders 40. Also, the second hydraulic circuit may have two inlet valves 221c and 221d connected to the second hydraulic flow path 212 and configured to control hydraulic pressures delivered to wheel cylinders 40.

Also, each of the inlet valves 221 may be disposed on the upstream side of the wheel cylinders 40 and provided as a normally open solenoid valve, which operates such that the valve is normally open but is closed when a closing signal is received from the ECU.

Also, the hydraulic circuits 201 and 202 may include check valves 223a, 223b, 223c, and 223d provided in a bypass flow path that connects a front stage and a rear stage of each of the inlet valves 221a, 221b, 221c, and 221d. The check valves 223a, 223b, 223c, and 223d may be provided to allow only oil flow in a direction from the wheel cylinders 40 to the hydraulic pressure providing unit 110 and limit oil flow in a direction from the hydraulic pressure providing unit 110 to the wheel cylinders 40. The check valves 223a, 223b, 223c, and 223d may enable a brake pressure to be quickly discharged from the wheel cylinders 40 and may enable a hydraulic pressure of the wheel cylinders 40 to flow into the hydraulic pressure providing unit 110 when the inlet valves 221a, 221b, 221c, and 221d do not operate normally.

Also, the hydraulic circuits 201 and 202 may further include a plurality of outlet valves 222 (222a, 222b, 222c, and 222d) connected to the reservoir 30 in order to enhance performance when the braking is released. The outlet valves 222 are connected to the wheel cylinders 40 and configured to control a hydraulic pressure to be discharged from the wheels RR, RL, FR, and FL. That is, the outlet valves 222 may sense braking pressures of the wheels RR, RL, FR, and FL and may be selectively opened to control the pressures when decompression braking is needed.

Also, each of the outlet valves 222 may be provided as a normally closed solenoid valve, which operates such that the valve is normally closed but is opened when an opening signal is received from the ECU.

Also, the hydraulic pressure control unit 200 may be connected to the backup flow paths 251 and 252. As an example, the first hydraulic circuit may be connected to the first backup flow path 251 to receive a hydraulic pressure from the master cylinder 20, and the second hydraulic circuit may be connected to the second backup flow path 252 to receive a hydraulic pressure from the master cylinder 20, The first backup flow path 251 may join the first hydraulic circuit on the downstream of the first inlet valve 221a or the second inlet valve 221b. Likewise, the second backup flow path 252 may join the second hydraulic circuit on the downstream of the third inlet valve 221c or the fourth inlet valve 221d.

Accordingly, when the first and second cut valves 261 and 262 are closed, a hydraulic pressure provided by the hydraulic pressure supply device 100 may be supplied to the wheel cylinders 40 through the first and second hydraulic circuits. When the first and second cut valves 261 and 262 are opened, a hydraulic pressure provided by the master cylinder 20 may be supplied to the wheel cylinders 40 through the first and second backup flow paths 251 and 252. In this case, since the plurality of inlet valves 221a, 221b, 221c, and 221d are opened, there is no need to change their operational states.

Although not described, a reference numeral "PS1" indicates a hydraulic flow path pressure sensor configured to sense hydraulic pressures of the hydraulic circuits 201 and 202, and a reference numeral "PS2" indicates a backup flow path pressure sensor configured to measure an oil pressure of the master cylinder 20. Also, a reference numeral "MPS" indicates a motor control sensor configured to control a rotational angle or electric current of the motor 120.

An operation of the electronic brake system 1 according to the first embodiment of the present disclosure will be described below in detail.

The hydraulic pressure supply device 100 may be used in a low-voltage mode or a high-voltage mode depending on the case. The low-voltage mode and the high-voltage mode may be switched between each other by changing the operation of the hydraulic pressure control unit 200. By using the high-voltage mode, the hydraulic pressure supply device 100 may generate a high hydraulic pressure even without increasing power of the motor 120. Accordingly, it is possible to secure a stable braking force while lowering the price and weight of the brake system.

More specifically, as the hydraulic piston 114 moves forward, a hydraulic pressure is generated in the first pressure chamber 112. As the hydraulic piston 114 moves forward in an initial state, that is, as a stroke of the hydraulic piston 114 advances, the amount of oil transferred from the first pressure chamber 112 to the wheel cylinders 40 increases, and thus the braking pressure increases. However, a maximum pressure due to the advance of the hydraulic piston 114 exists because there is an effective stroke of the hydraulic piston 114.

In this case, the maximum pressure in the low-voltage mode is smaller than the maximum pressure in the high-voltage mode. However, the high-voltage mode has a smaller pressure increase rate per stroke of the hydraulic piston 114 than the low-voltage mode. This is because oil pushed from the first pressure chamber 112 does not entirely flow into the wheel cylinders 40 but partially flows into the second pressure chamber 113.

Accordingly, the low-voltage mode, which has a high pressure increase rate per stroke, may be used in an early braking stage where braking responsiveness is important, and the high-voltage mode, which has a high maximum pressure, may be used in a late braking stage where the maximum braking force is important.

When braking is started by a driver, a braking amount required by the driver may be sensed by the pedal displacement sensor 11 through information such as a pressure of the brake pedal 10 depressed by the driver. The ECU (not shown) receives an electrical signal output from the pedal displacement sensor 11 and drives the motor 120.

Also, the ECU may receive a regenerative braking amount through the backup flow path pressure sensor PS2 provided at the exit side of the master cylinder 20 and the hydraulic flow path pressure sensors PS1 provided in the second hydraulic circuit and may calculate a frictional braking amount according to a difference between the required braking amount and the regenerative braking amount to find the magnitude of increase or decrease in pressure of the wheel cylinders 40.

When the driver depresses the brake pedal 10 in the early braking stage, the motor 120 is operated to rotate in one direction. In this case, a rotational force of the motor 120 is transferred to the hydraulic pressure providing unit 110 by the power converter 130, and a hydraulic pressure is generated in the first pressure chamber 112 as the hydraulic piston 114 of the hydraulic pressure providing unit 110 moves forward. The hydraulic pressure discharged from the hydraulic pressure providing unit 110 is transferred to the wheel cylinders 40 provided in the four wheels through the first hydraulic circuit and the second hydraulic circuit to generate a braking force.

In detail, the hydraulic pressure provided by the first pressure chamber 112 is directly transferred to the wheel cylinders 40 provided in the two wheels FR and RL through the first hydraulic flow path 211 and the second hydraulic flow path 212 connected to the first communication hole 111a. In this case, the first and second inlet valves 221a and 221b installed in two flow paths branching from the second hydraulic flow path 212 are provided in open states. Also, the first and second outlet valves 222a and 222b installed in flow paths branching from the two flow paths branching from the second hydraulic flow path 212 are kept closed to block the hydraulic pressure from leaking into the reservoir 30.

Also, the hydraulic pressure provided by the first pressure chamber 112 is directly transferred to the wheel cylinders 40 provided in the two wheels RR and FL through the first hydraulic flow path 211 and the third hydraulic flow path 213 connected to the first communication hole 111a. In this case, the third and fourth inlet valves 221c and 221d installed in two flow paths branching from the third hydraulic flow path 213 are provided in open states. Also, the third and fourth outlet valves 222c and 222d installed in flow paths branching from the two flow paths branching from the third hydraulic flow path 213 are kept closed to block the hydraulic pressure from leaking into the reservoir 30.

Also, the fifth control valve 235 and the sixth control valve 236 may be opened to open the seventh hydraulic flow path 217 and the eighth hydraulic flow path 218. When the seventh hydraulic flow path 217 and the eighth hydraulic flow path 218 are opened, the second hydraulic flow path 212 and the third hydraulic flow path 213 communicate with each other. However, one or both of the fifth control valve 235 and the sixth control valve 236 may be kept closed, if necessary.

Also, the third control valve 233 may be kept closed to block the fifth hydraulic flow path 215. By blocking the hydraulic pressure generated in the first pressure chamber 112 from being transferred to the second pressure chamber 113 through the fifth hydraulic flow path 215 connected to the second hydraulic flow path 212, it is possible to enhance a pressure increase rate per stroke. Accordingly, a quick braking response may be expected in the early braking stage.

Also, when the pressure transferred to the wheel cylinders 40 is measured as being higher than a target pressure corresponding to the pedal effort applied to the brake pedal 10, the pressure may be controlled to follow the target pressure by opening one or more of the first to fourth outlet valves 222.

Also, when the hydraulic pressure is generated in the hydraulic pressure supply device 100, the first and second cut valves 261 and 262 installed in the first and second backup flow paths 251 and 252 connected to the first and second hydraulic ports 24a and 24b of the master cylinder 20 are closed so that the hydraulic pressure discharged from the master cylinder 20 is not transferred to the wheel cylinders 40.

Also, the pressure generated by an increase in pressure of the master cylinder 20 according to the pedal effort applied to the brake pedal 10 is transferred to the simulation device 50 connected to the master cylinder 20. In this case, the normally closed simulator valve 54 disposed at the front end of the simulation chamber 51 is opened to fill the simulation chamber 51 with oil through the simulator valve 54. Also, as the reaction force piston 52 moves, a pressure corresponding to the weight of the reaction force spring 53 supporting the reaction force piston 52 is formed in the simulation chamber 51 to provide an appropriate braking feel to the driver.

Also, the hydraulic flow path pressure sensor PS1 installed in the second hydraulic flow path 212 may detect the amount of fluid transferred to the wheel cylinder 40 installed in the front left wheel FL or the rear right wheel RR (hereinafter simply referred to as the wheel cylinder 40). Accordingly, by controlling the hydraulic pressure supply device 100 according to an output of the hydraulic flow path pressure sensor PS1, it is possible to control the amount of fluid transferred to the wheel cylinder 40. In detail, by adjusting an advance distance and an advance speed of the hydraulic piston 114, it is possible to control the amount of fluid discharged from the wheel cylinder 40 and a discharge speed of the fluid.

Meanwhile, before the hydraulic piston 114 advances to the maximum extent, the low-voltage mode may be switched to the high-voltage mode.

In the high-voltage mode, the third control valve 233 may be opened to open the fifth hydraulic flow path 215. Accordingly, the hydraulic pressure generated in the first pressure chamber 112 may be transferred to the second pressure chamber 113 through the fifth hydraulic flow path connected to the second hydraulic flow path 212 and may be used to push the hydraulic piston 114.

In the high-voltage mode, the pressure increase rate per stroke decreases because a portion of the oil pushed from the first pressure chamber 112 flows into the second pressure chamber 113. However, the maximum pressure increases because a portion of the hydraulic pressure generated in the first pressure chamber 112 is used to push the hydraulic piston 114. At this point, the reason the maximum pressure increases is that a volume per stroke of the hydraulic piston 114 of the second pressure chamber 113 is smaller than a volume per stroke of the hydraulic piston 114 of the first pressure chamber 112.

Also, the hydraulic pressure supply device 100 according to the first embodiment of the present disclosure may provide a braking pressure as the hydraulic piston 114 moves backward.

When the driver depresses the brake pedal 10 in the early braking stage, the motor 120 is operated to rotate in the opposite direction. In this case, a rotational force of the motor 120 is transferred to the hydraulic pressure providing unit 110 by the power converter 130, and a hydraulic pressure is generated in the second pressure chamber 113 as the hydraulic piston 114 of the hydraulic pressure providing unit 110 moves backward. The hydraulic pressure discharged from the hydraulic pressure providing unit 110 is transferred to the wheel cylinders 40 provided in the four wheels through the first hydraulic circuit and the second hydraulic circuit to generate a braking force.

In detail, the hydraulic pressure provided by the second pressure chamber 113 is directly transferred to the wheel cylinders 40 provided in the two wheels FR and RL through the fourth hydraulic flow path 214 and the fifth hydraulic flow path 215 connected to the second communication hole 111b. In this case, the first and second inlet valves 221a and 221b installed in two flow paths branching from the fifth hydraulic flow path 215 are provided in the open states. Also, the first and second outlet valves 222a and 222b installed in flow paths branching from the two flow paths branching from the second hydraulic flow path 212 are kept closed to block the hydraulic pressure from leaking into the reservoir 30.

Also, the hydraulic pressure provided by the second pressure chamber 113 is directly transferred to the wheel cylinders 40 provided in the two wheels RR and FL through the fourth hydraulic flow path 214 and the sixth hydraulic flow path 216 connected to the second communication hole 111b. In this case, the third and fourth inlet valves 221c and 221d installed in two flow paths branching from the sixth hydraulic flow path 216 are provided in the open states. Also, the third and fourth outlet valves 222c and 222d installed in flow paths branching from the two flow paths branching from the sixth hydraulic flow path 216 are kept closed to block the hydraulic pressure from leaking into the reservoir 30.

Also, the third control valve 233 may be opened to open the fifth hydraulic flow path 215. Meanwhile, the sixth hydraulic flow path 216 is opened because the fourth control valve 234 is provided as a check valve that allows a hydraulic pressure to be transferred in a direction from the second pressure chamber 113 to the wheel cylinder 40.

Also, the sixth control valve 236 may be kept closed to block the eighth hydraulic flow path 218. By blocking the hydraulic pressure generated in the second pressure chamber 113 from being transferred to the first pressure chamber 112 through the eighth hydraulic flow path 218 connected to the fifth hydraulic flow path 215, it is possible to enhance a pressure increase rate per stroke. Accordingly, a quick braking response may be expected in the early braking stage.

Subsequently, a case in which a braking force is released while braking is achieved during normal operation of the electronic brake system 1 according to the first embodiment of the present disclosure will be described.

When the pedal effort is released from the brake pedal 10, the motor 120 generates a rotational force in a direction opposite to that during braking and transfers the generated rotational force to the power converter 130, and the worm shaft 131, the worm wheel 132, and the driving shaft 133 of the power converter 130 rotate in directions opposite to those during braking to move the hydraulic piston 114 back to an original position thereof, thereby releasing the pressure of the first pressure chamber 112 or generating a negative pressure in the first pressure chamber 112. Also, the hydraulic pressure providing unit 110 receives a hydraulic pressure discharged from the wheel cylinders 40 through the first and second hydraulic circuits and transfers the hydraulic pressure to the first pressure chamber 112.

In detail, the negative pressure generated in the first pressure chamber 112 releases the pressure of the wheel cylinders 40 provided in the two wheels FR and RL through the first hydraulic flow path 211 and the second hydraulic flow path 212 connected to the first communication hole 111a. In this case, the first and second inlet valves 221a and 221b installed in two flow paths branching from the second hydraulic flow path 212 are provided in the open states. Also, the first and second outlet valves 222a and 222b installed in flow paths branching from the two flow paths branching from the second hydraulic flow path 212 are kept closed to block the oil of the reservoir 30 from flowing in.

Also, the negative pressure generated in the first pressure chamber 112 releases the pressure of the wheel cylinders 40 provided in the two wheels FL and RR through the first hydraulic flow path 211 and the third hydraulic flow path 213 connected to the first communication hole 111a. In this case, the third and fourth inlet valves 221c and 221d installed in two flow paths branching from the third hydraulic flow path 213 are provided in the open states. Also, the third and fourth outlet valves 222c and 222d installed in flow paths branching from the two flow paths branching from the third hydraulic flow path 213 are kept closed to block the oil of the reservoir 30 from flowing in.

Also, the third control valve 233 may be opened to open the fifth hydraulic flow path 215, the fifth control valve 235 may be opened to open the seventh hydraulic flow path 217, and the sixth control valve 236 may be opened to open the eighth hydraulic flow path 218. As the fifth hydraulic flow path 215, the seventh hydraulic flow path 217, and the eighth hydraulic flow path 218 communicate with one another, the first pressure chamber 112 and the second pressure chamber 113 communicate with each other.

In order to form a negative pressure in the first pressure chamber 112, the hydraulic piston 114 should move backward. When the second pressure chamber 113 is filled with oil, resistance occurs while the hydraulic piston 114 moves backward. In this case, when the third control valve 233, the fifth control valve 235, and the sixth control valve 236 are opened so that the fourth hydraulic flow path 214 and the fifth hydraulic flow path 215 communicate with the second hydraulic flow path 212 and the first hydraulic flow path 211, oil in the second pressure chamber 113 moves to the first pressure chamber 112.

Also, the third dump valve 243 may be closed. By closing the third dump valve 243, it is possible to discharge the oil in the second pressure chamber 113 only to the fourth hydraulic flow path 214. However, depending on the case, the third dump valve 243 may be kept open, and thus the oil in the second pressure chamber 113 may flow into the reservoir 30.

Also, when the negative pressure transferred to the first and second hydraulic circuits is measured as being higher than a target released pressure corresponding to an amount of release of the brake pedal 10, the negative pressure may be controlled to follow the target released pressure by opening one or more of the first to fourth outlet valves 222.

Also, when the hydraulic pressure is generated in the hydraulic pressure supply device 100, the first and second cut valves 261 and 262 installed in the first and second backup flow paths 251 and 252 connected to the first and second hydraulic ports 24a and 24b of the master cylinder 20 are closed so that the negative pressure generated in the master cylinder 20 is not transferred to the hydraulic pressure control unit 200.

In the high-voltage mode, a pressure decrease rate of the wheel cylinders is small because oil in the second pressure chamber 113 is moved to the first pressure chamber 112 along with oil in the wheel cylinders 40 by the negative pressure in the first pressure chamber 112 generated as the hydraulic piston 114 moves backward. Accordingly, it may be difficult to quickly release the pressure in the high-voltage mode.

Figure 7:
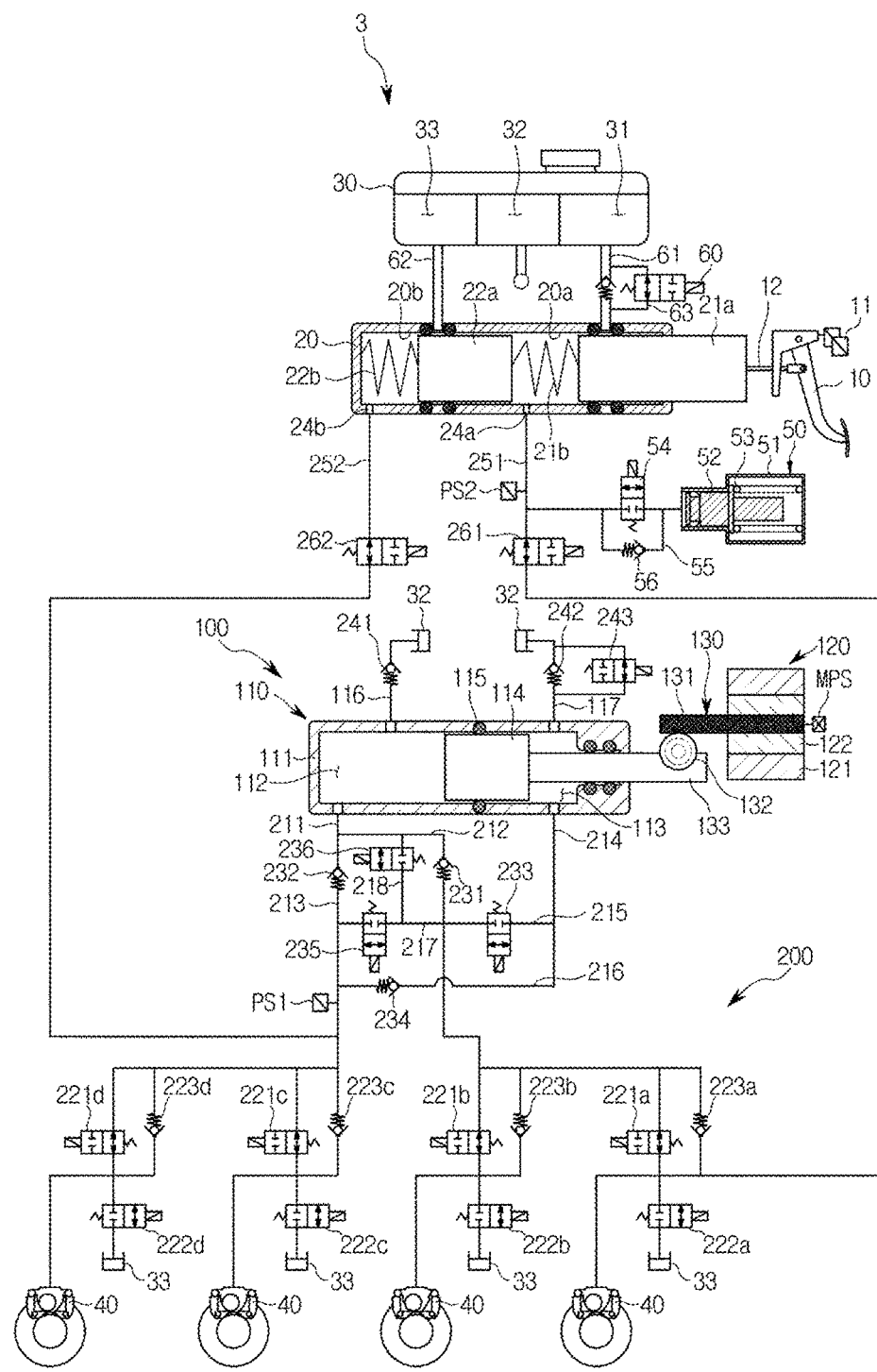
FIG. 7 is a hydraulic circuit diagram showing a non-braking state of an electronic brake system according to a third embodiment of the present disclosure.

Thus, the high-voltage mode may be used only in a high-voltage condition and may be switched to the low-voltage mode shown in FIG. 7 when the pressure decreases to a certain level or less.

In the low-voltage mode, the third dump valve 243 may be opened or kept open to connect the second pressure chamber 113 to the reservoir 30, instead of the third control valve being closed or kept closed to close the fifth hydraulic flow path 215.

In the low-voltage mode, the hydraulic piston 114 has a larger pressure decrease rate per stroke than in the high-voltage mode because the negative pressure generated in the first pressure chamber 112 is used only to suction the oil stored in the wheel cylinders 40.

Alternatively, when the hydraulic piston 114 moves in the opposite direction, that is, when the hydraulic pistons moves forward, the braking force of the wheel cylinders may be released.

Also, the hydraulic pressure supply device 100 according to the first embodiment of the present disclosure may release a braking pressure as the hydraulic piston 114 moves forward.

When the pedal effort is released from the brake pedal 10, the motor 120 generates a rotational force in a direction opposite to that during braking and transfers the generated rotational force to the power converter 130, and the worm shaft 131, the worm wheel 132, and the driving shaft 133 of the power converter 130 rotate in directions opposite to those during braking to move the hydraulic piston 114 to an original position thereof, thereby releasing the pressure of the second pressure chamber 113 or generating a negative pressure in the second pressure chamber 113. Also, the hydraulic pressure providing unit 110 receives a hydraulic pressure discharged from the wheel cylinders 40 through the first and second hydraulic circuits and transfers the hydraulic pressure to the second pressure chamber 113.

In detail, the negative pressure generated in the second pressure chamber 113 releases the pressure of the wheel cylinders 40 provided in the two wheels FR and RL through the fourth hydraulic flow path 214 and the fifth hydraulic flow path 215 connected to the second communication hole 111b. In this case, the first and second inlet valves 221a and 221b installed in two flow paths branching from the second hydraulic flow path 212 are provided in the open states. Also, the first and second outlet valves 222a and 222b installed in flow paths branching from the two flow paths branching from the second hydraulic flow path 212 are kept closed to block the oil of the reservoir 30 from flowing in.

Also, the negative pressure generated in the second pressure chamber 113 releases the pressure of the wheel cylinders 40 provided in the two wheels FL and RR through the fourth hydraulic flow path 214, the fifth hydraulic flow path 215, the seventh hydraulic flow path 217, and the third hydraulic flow path 213 connected to the second communication hole 111b. In this case, the third and fourth inlet valves 221c and 221d installed in two flow paths branching from the third hydraulic flow path 213 are provided in the open states. Also, the third and fourth outlet valves 222c and 222d installed in flow paths branching from the two flow paths branching from the third hydraulic flow path 213 are kept closed to block the oil of the reservoir 30 from flowing in.

Also, the third control valve 233 may be opened to open the fifth hydraulic flow path 215, and the fifth control valve 235 may be opened to open the seventh hydraulic flow path 217.

Also, when the negative pressure transferred to the first and second hydraulic circuits is measured as being higher than a target released pressure corresponding to an amount of release of the brake pedal 10, the negative pressure may be controlled to follow the target released pressure by opening one or more of the first to fourth outlet valves 222.

Also, when the hydraulic pressure is generated in the hydraulic pressure supply device 100, the first and second cut valves 261 and 262 installed in the first and second backup flow paths 251 and 252 connected to the first and second hydraulic ports 24a and 24b of the master cylinder 20 are closed so that the negative pressure generated in the master cylinder 20 is not transferred to the hydraulic pressure control unit 200.

Also, the hydraulic flow path pressure sensor PS1 installed in the second hydraulic flow path 212 may detect the amount of fluid discharged from the wheel cylinder 40 installed in the front left wheel FL or the rear right wheel RR. Accordingly, by controlling the hydraulic pressure supply device 100 according to an output of the hydraulic flow path pressure sensor PS1, it is possible to control the amount of fluid discharged from the wheel cylinder 40. In detail, by adjusting an advance distance and an advance speed of the hydraulic piston 114, it is possible to control the amount of fluid discharged from the wheel cylinder 40 and a discharge speed of the fluid.

Subsequently, a case in which the electronic brake system 1 does not operate normally will be described. That is, a fallback mode condition will be described below.

When the electronic brake system 1 does not operate normally, the valves 54, 60, 221a, 221b, 221c, 221d, 222a, 222b, 222c, 222d, 233, 235, 236, 243, 261, and 262 are provided in the early stage of braking, which is an inactive state.

When a driver depresses the brake pedal 10, the input rod 12 connected to the brake pedal 10 moves forward. At the same time, the first piston brought into contact with the input rod 12 moves forward, and also the second piston 22a moves forward due to pressing or movement of the first piston 21a. In this case, there is no gap between the input rod 12 and the first piston 21a, and thus it is possible to quickly perform a braking action.

Also, a braking force is achieved by transferring, to the wheel cylinders 40 through the first and second backup flow paths 251 and 152 connected for a backup braking action, the hydraulic pressure discharged from the master cylinder 20.

In this case, the first and second cut valves 261 and 262 installed in the first and second backup flow paths 251 and 252 and the inlet valves 221 for opening and closing flow paths of the first hydraulic circuit and the second hydraulic circuit are each configured as a normally open solenoid valve, and the simulator valve 54 and the outlet valves 222 may each be configured as a normally closed solenoid valve. Thus, the hydraulic pressure is directly transferred to the four wheel cylinders 40. Accordingly, it is possible to stably perform a braking action and enhance braking stability.

Figure 4:
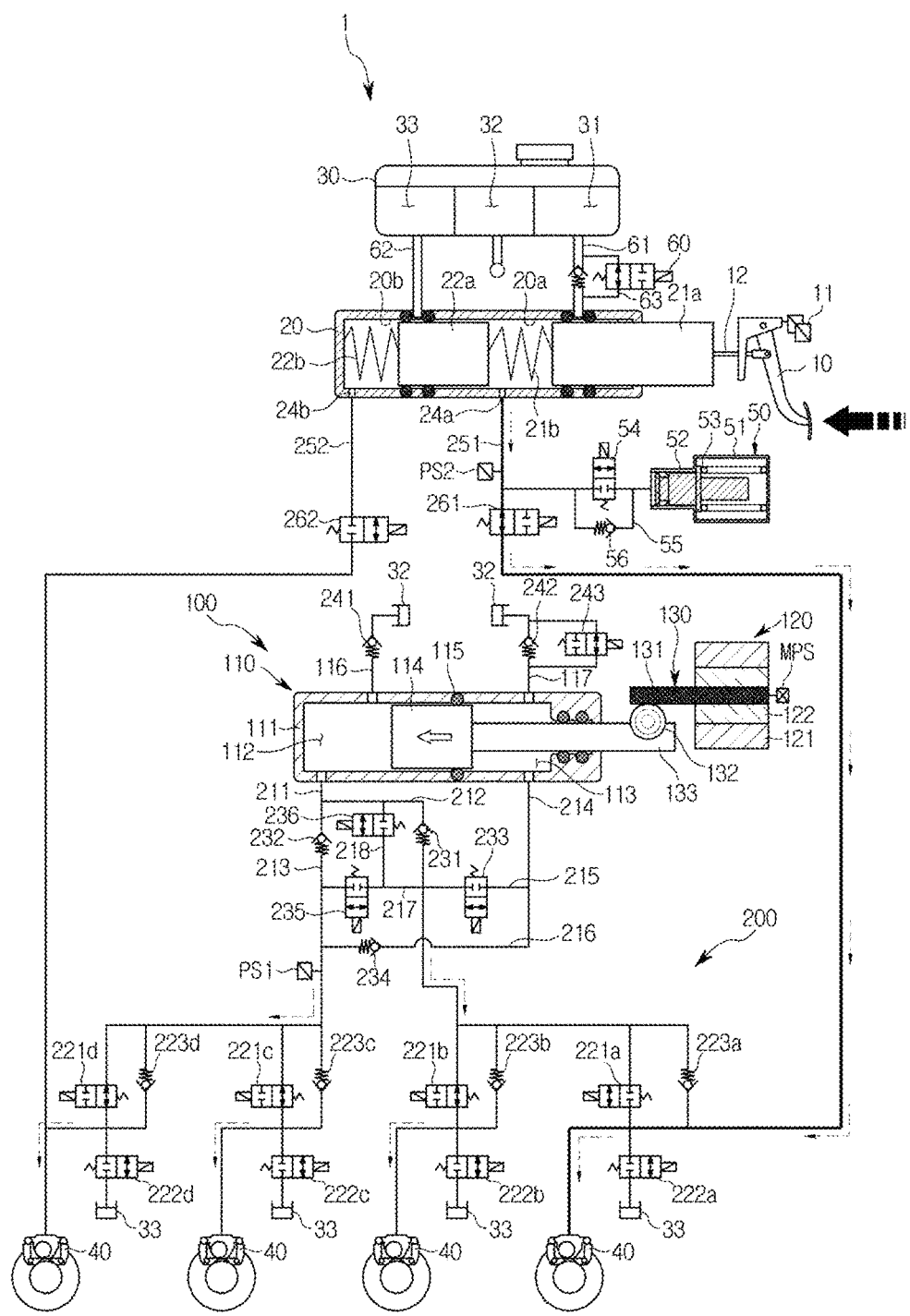
FIG. 4 is a hydraulic circuit diagram showing a state in which a braking pressure of a master cylinder is transferred to a wheel cylinder while a simulator valve is stuck or while a first cut valve is leaking.

FIG. 4 is a hydraulic circuit diagram showing a state in which a braking pressure of the master cylinder 20 is transferred to the wheel cylinder 40 while the simulator valve 54 is stuck or while the first cut valve 261 is leaking.

Referring to FIG. 4, an abnormal condition in which the simulator valve 54 is stuck in a closed state may occur in the electronic brake system 1 according to the first embodiment of the present disclosure. Whether the simulator valve 54 is stuck may be inspected by means of the inspection valve 60, and detailed description thereof will be omitted.

When it is determined that the simulator valve 54 is stuck in a closed state, the ECU keeps the first cut valve 261 open and closes the second cut valve 262.

When the ECU closes the first and second cut valves 261 and 262 although the simulator valve 54 is stuck in a closed state, the hydraulic pressure formed in the master cylinder 20 cannot be discharged to the outside. That is, the brake pedal 10 does not move and work although a driver applies a pedal effort to the brake pedal 10.

Since the simulator valve 54 is stuck in a closed state, it is difficult to use the simulation device 50 to provide a reaction force corresponding to the pedal effort of the brake pedal 10. This is because brake fluid in the first master chamber 20a does not sufficiently flow into the simulation device 50 through the simulator valve 54.

Accordingly, the ECU closes only the second cut valve 262 while keeping the first cut valve 261 open. Accordingly, the hydraulic pressure formed in the first master chamber 20a is transferred to the first hydraulic circuit along the first backup flow path 251.

Also, an abnormal condition in which the first cut valve 261 is leaking may occur in the electronic brake system 1 according to the first embodiment of the present disclosure. When the first cut valve 261 is leaking, the first backup flow path 251 may not be blocked despite a closing signal of the ECU. Whether the first cut valve 261 is leaking may be inspected by means of the inspection valve 60, and detailed description thereof will be omitted.

When it is determined that the first cut valve 261 is leaking, the ECU keeps the first cut valve 261 open and closes the second cut valve 262.

Since the first cut valve 261 is leaking, it is difficult to use the simulation device 50 to provide a reaction force corresponding to the pedal effort of the brake pedal 10. This is because brake fluid in the first master chamber 20a is leaking through the first cut valve 261 and thus does not sufficiently flow into the simulation device 50.

Accordingly, the ECU keeps the first cut valve 261 open and keeps the simulator valve 54 closed. Accordingly, the hydraulic pressure formed in the first master chamber 20a is transferred to the first hydraulic circuit along the first backup flow path 251.

Meanwhile, the first backup flow path 251 may be connected to a downstream side of the first inlet valve 221a. Also, the ECU may close the first inlet valve 221a.

Accordingly, to form a braking force, the hydraulic pressure formed in the first master chamber 20a is transferred along the first backup flow path 251 to the wheel cylinder 40 provided in the front right wheel FR. Also, during this process, the driver may be provided with a pedal feel through the reaction force provided to the brake pedal 10. In this case, the pedal feel provided to the driver may be similar to a pedal feel in the fallback mode.

Also, the hydraulic pressure supply device 100 is activated by an electrical signal of the pedal displacement sensor 11 corresponding to a displacement of the brake pedal 10, and to form a braking force, the hydraulic pressure formed in the hydraulic pressure providing unit 110 is transferred to the wheel cylinders 40 installed in the rear left wheel RL, the rear right wheel RR, and the front left wheel FL through the second, third, and fourth inlet valves 221b, 221c, and 221d, which are opened. Accordingly, it is possible to stably form the braking force in all of the four wheel cylinders 40.

When the ECU opens the first inlet valve 221a although the first cut valve 261 is leaking, the hydraulic pressure formed in the hydraulic pressure supply device 100 flows into the master cylinder 20 and pushes the brake pedal 10. That is, resistance occurs in the brake pedal 10, and thus a sufficient braking force required by a driver is not generated.

Figure 5:
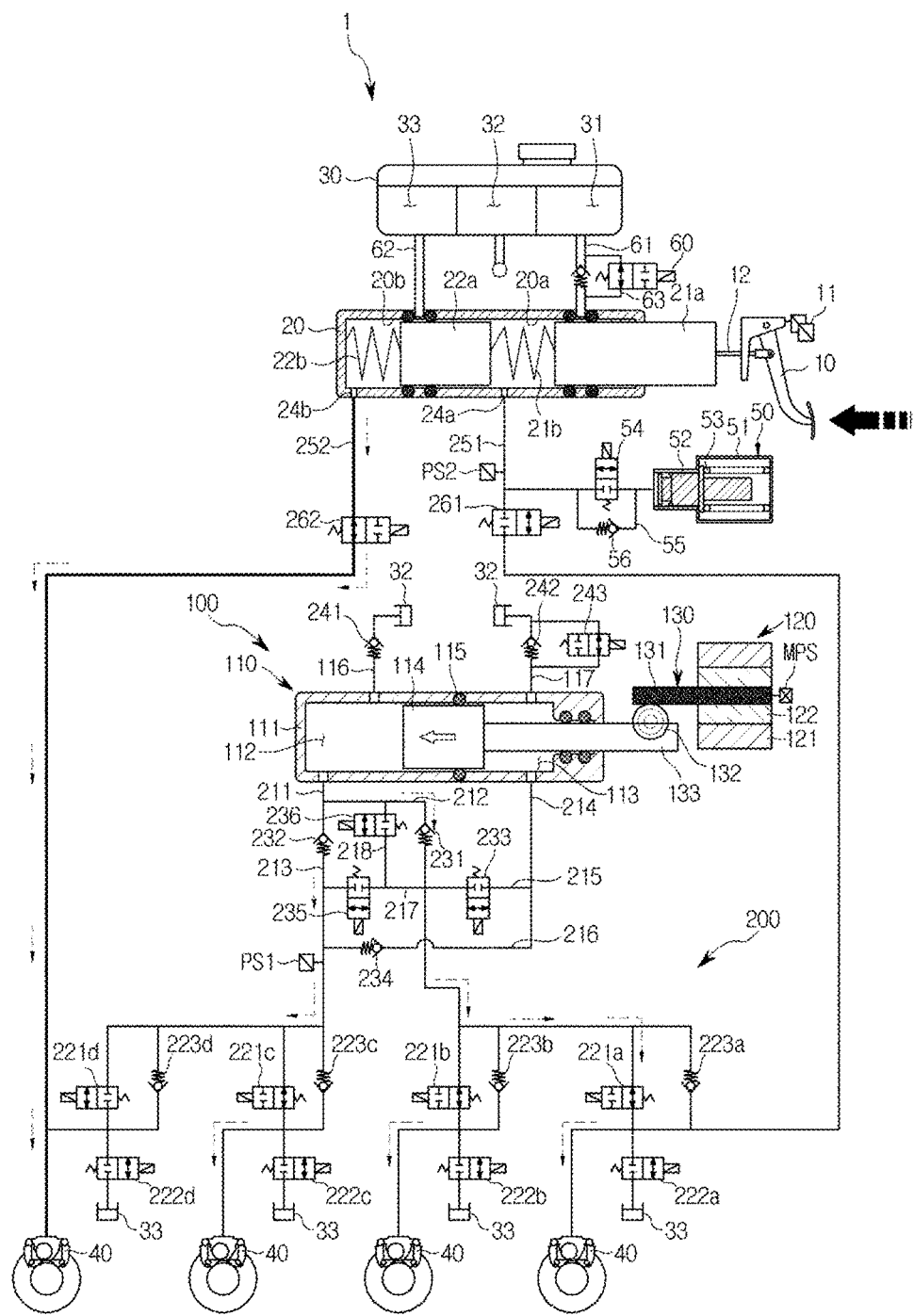
FIG. 5 is a hydraulic circuit diagram showing a state in which a braking pressure of the master cylinder is transferred to the wheel cylinder while a second cut valve is leaking.

FIG. 5 is a hydraulic circuit diagram showing a state in which a braking pressure of the master cylinder 20 is transferred to the wheel cylinder 40 while the second cut valve 262 is leaking.

Referring to FIG. 5, an abnormal condition in which the second cut valve 262 is leaking may occur in the electronic brake system 1 according to the first embodiment of the present disclosure. When the second cut valve 262 is leaking, the second backup flow path 252 may not be blocked despite a closing signal of the ECU. Whether the second cut valve 262 is leaking may be inspected by means of the inspection valve 60, and detailed description thereof will be omitted.

When it is determined that the second cut valve 262 is leaking, the ECU keeps the second cut valve 262 open and closes the first cut valve 261.

Since the second cut valve 262 is leaking, it is difficult to use the simulation device 50 to provide a reaction force corresponding to the pedal effort of the brake pedal 10. This is because brake fluid in the second master chamber 20b is leaking through the second cut valve 262 and thus does not sufficiently flow into the simulation device 50.

Accordingly, the ECU closes the first cut valve 261 and keeps the simulator valve 54 closed. Accordingly, the hydraulic pressure formed in the first master chamber 20a is transferred to the second hydraulic circuit along the second backup flow path 252.

Meanwhile, the second backup flow path 252 may be connected to a downstream side of the fourth inlet valve 221d. Also, the ECU may close the fourth inlet valve 221d.

Accordingly, to form a braking force, the hydraulic pressure formed in the second master chamber 20b is transferred along the second backup flow path 252 to the wheel cylinder 40 provided in the front left wheel FL. Also, during this process, the driver may be provided with a pedal feel through the reaction force provided to the brake pedal 10. In this case, the pedal feel provided to the driver may be similar to a pedal feel in the fallback mode.

Also, the hydraulic pressure supply device 100 is activated by an electrical signal of the pedal displacement sensor 11 corresponding to a displacement of the brake pedal 10, and to form a braking force, the hydraulic pressure formed in the hydraulic pressure providing unit 110 is transferred to the wheel cylinders 40 installed in the front left wheel FL, the rear left wheel RL, and the rear right wheel RR through the first, second, third inlet valves 221a, 221b, and 221c, which are opened. Accordingly, it is possible to stably form the braking force in all of the four wheel cylinders 40.

When the ECU opens the fourth inlet valve 221d although the second cut valve 262 is leaking, the hydraulic pressure formed in the hydraulic pressure supply device 100 flows into the reservoir 30 through the master cylinder 20. That is, the hydraulic pressure generated in the hydraulic pressure supply device 100 is not transferred to the wheel cylinders 40, and thus a braking action is not performed.

Figure 6:
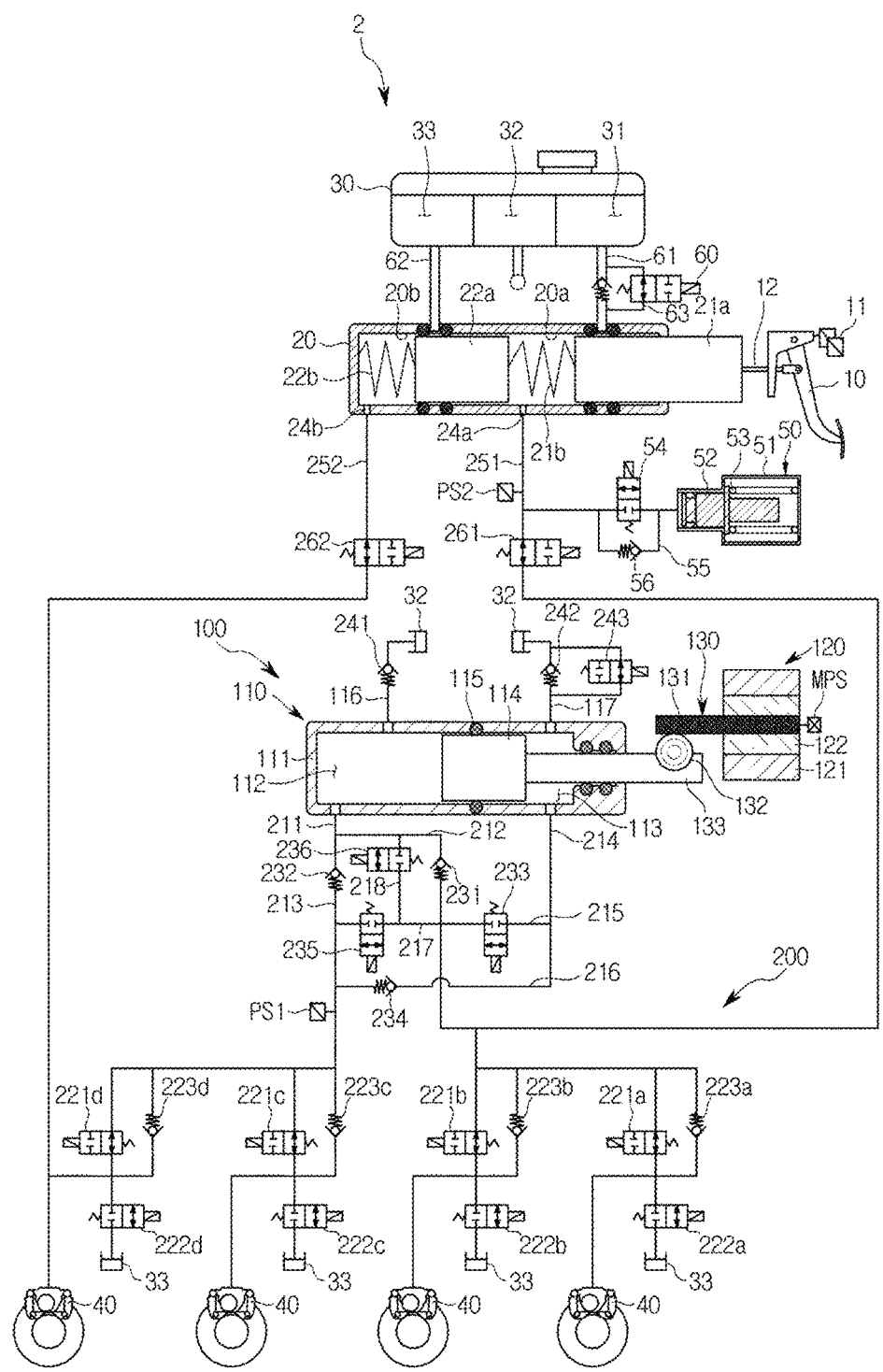
FIG. 6 is a hydraulic circuit diagram showing a non-braking state of an electronic brake system according to a second embodiment of the present disclosure.

FIG. 6 is a hydraulic circuit diagram showing a non-braking state of an electronic brake system 2 according to a second embodiment of the present disclosure.

The electronic brake system 2 according to the second embodiment of the present disclosure may have different connection methods for the first backup flow path 251 and the second backup flow path 252.

Referring to FIG. 6, the first backup flow path 251 makes the first master chamber 20a communicate with the second hydraulic flow path 212 and has a rear end connected between the first control valve 231 and the first and second inlet valves 221a and 221b. For example, the rear end of the first backup flow path 251 is connected to front ends of the first and second inlet valves 221a and 221b before the second hydraulic flow path 212 branches.

Also, the second backup flow path 252 makes the second master chamber 20b communicate with the third hydraulic flow path 213 and has a rear end connected between the third inlet valve 221c or the fourth inlet valve 221d and the wheel cylinders 40. For example, the rear end of the second backup flow path 252 is connected to a rear end of the fourth inlet valve 221d.

FIG. 7 is a hydraulic circuit diagram showing a non-braking state of an electronic brake system 3 according to a third embodiment of the present disclosure.

The electronic brake system 3 according to the third embodiment of the present disclosure may have different connection methods for the first backup flow path 251 and the second backup flow path 252.

Referring to FIG. 7, the first backup flow path 251 makes the first master chamber 20a communicate with the second hydraulic flow path 212 and has a rear end connected between the first inlet valve 221a or the second inlet valve 221b and the wheel cylinders 40. For example, the rear end of the first backup flow path 251 is connected to a rear end of the first inlet valve 221a.

Also, the second backup flow path 252 makes the second master chamber 20b communicate with the third hydraulic flow path 213 and has a rear end connected between the second control valve 232 and the third and fourth inlet valves 221c and 221d. For example, the rear end of the second backup flow path 252 is connected to front ends of the third and fourth inlet valves 221c and 221d before the third hydraulic flow path 213 branches.

According to the first embodiments of the present disclosure, by directly connecting a cut valve to a wheel cylinder, it is possible to prevent the occurrence of braking interference because a hydraulic pressure of a hydraulic pressure supply device is not transferred to a brake pedal even when the cut valve is leaking.

Also, by directly connecting a cut valve to a wheel cylinder, it is possible to prevent a hydraulic pressure of a hydraulic pressure supply device from being transferred to a reservoir even when the cut valve is leaking, thereby generating a sufficient braking pressure.

Also, by directly connecting a cut valve to a wheel cylinder, it is possible to directly transfer master cylinder fluid to the wheel cylinder even when a SIM value is stuck in a closed state, thereby generating deceleration of a vehicle according to a driver's braking intent.

What is claimed is:
1. An electronic brake system comprising:
a master cylinder connected to a reservoir in which brake fluid is stored and configured to discharge the brake fluid according to a pedal effort of a brake pedal, the master cylinder including first and second master chambers and first and second pistons provided in the master chambers;
a hydraulic pressure supply device activated by an electrical signal to generate a hydraulic pressure;
a hydraulic pressure control unit configured to transfer, to a plurality of wheel cylinders provided in wheels, a hydraulic pressure discharged from the hydraulic pressure supply device;
a first backup flow path configured to connect the first master chamber to the hydraulic pressure control unit;
a second backup flow path configured to connect the second master chamber to the hydraulic pressure control unit;
a first cut valve configured to selectively open and close the first backup flow path; a second cut valve configured to selectively open and close the second backup flow path; and
a plurality of inlet valves installed on an upstream side of the plurality of wheel cylinders provided in the wheels,
wherein:
the first backup flow path is connected to the first master chamber and a downstream side of one of the plurality of inlet valves installed on the upstream side of the plurality of wheel cylinders,
the second backup flow path is connected to the second master chamber and a downstream side of an other of the plurality of inlet valves installed on the upstream side of the plurality of wheel cylinders,
the electronic brake system further comprises an electronic control unit configured to control operation of the first and second cut valves, and the plurality of inlet valves, and
the electronic control unit is configured to, when an abnormal condition in which the first cut valve or the second cut valve leaks, open one cut valve which leaks among the first and second cut valves and close another cut valve which does not leak among the first and second cut valves, a hydraulic pressure formed in the master cylinder by a displacement of the brake pedal is transferred to one of the plurality of wheel cylinders through one of the first and second backup flow paths having the one cut valve which leaks among the first and second cut valves, and the hydraulic pressure generated by the hydraulic pressure supply device is transferred to an other of the plurality of wheel cylinders.

2. The electronic brake system of claim 1, further comprising:
a simulation device configured to provide a reaction force corresponding to the pedal effort of the brake pedal, the simulation device including a simulation chamber connected to the master cylinder and configured to house brake fluid; and
a simulation valve configured to selectively open and close brake fluid flow flowing into the simulation chamber.

3. The electronic brake system of claim 2, wherein the simulation valve is installed in a flow path for connecting the first backup flow path to the simulation chamber.

4. The electronic brake system of claim 2, wherein when the first cut valve is leaking, the electronic control unit opens the first cut valve and closes the second cut valve and the simulation valve, and a hydraulic pressure generated in the master cylinder by forward movement of the brake pedal is transferred to the one or more of the plurality of wheel cylinders along the first backup flow path.

5. The electronic brake system of claim 4,
wherein the hydraulic pressure control unit includes first to fourth branch flow paths connected to the plurality of wheel cylinders provided in the wheels,
wherein the plurality of inlet valves include first to fourth inlet valves installed in the first to fourth branch flow paths,
wherein the electronic control unit, when the first cut valve leaks, closes the first inlet valve installed in the first branch flow path connected to the first backup flow path, and
wherein the electronic control unit, when the first cut valve leaks, opens the second to fourth inlet valves so that the hydraulic pressure generated in the hydraulic pressure supply device is transferred to the plurality of wheel cylinders through the second to fourth branch flow paths.

6. The electronic brake system of claim 2, wherein when the second cut valve is leaking, the electronic control unit opens the second cut valve and closes the first cut valve and the simulation valve, and a hydraulic pressure generated in the master cylinder by forward movement of the brake pedal is transferred to the different one or more of the plurality of wheel cylinders along the second backup flow path.

7. The electronic brake system of claim 6,
wherein the hydraulic pressure control unit includes first to fourth branch flow paths connected to the plurality of wheel cylinders provided in the wheels,
wherein the plurality of inlet valves include first to fourth inlet valves installed in the first to fourth branch flow paths,
wherein the electronic control unit, when the second cut valve leaks, closes the fourth inlet valve installed in the fourth branch flow path connected to the second backup flow path, and
wherein the electronic control unit, when the second cut valve leaks, opens the first to third inlet valves so that the hydraulic pressure generated in the hydraulic pressure supply device is transferred to the plurality of wheel cylinders through the first to third branch flow paths.

8. The electronic brake system of claim 2, wherein when the simulation valve is stuck in a closed state, the electronic control unit opens the first cut valve and closes the second cut valve, and a hydraulic pressure generated in the master cylinder by forward movement of the brake pedal is transferred to the one or more of the plurality of wheel cylinders along the first backup flow path.

9. The electronic brake system of claim 8,
wherein the hydraulic pressure control unit includes first to fourth branch flow paths connected to the plurality of wheel cylinders provided in the wheels,
wherein the plurality of inlet valves include first to fourth inlet valves installed in the first to fourth branch flow paths,
wherein the electronic control unit, when the simulation valve is stuck in the closed state, closes the first inlet valve installed in the first branch flow path connected to the first backup flow path, and
wherein the electronic control unit, when the simulation valve is stuck in the closed state, opens the second to fourth inlet valves so that the hydraulic pressure generated in the hydraulic pressure supply device is transferred to the plurality of wheel cylinders through the second to fourth branch flow paths.

10. The electronic brake system of claim 1, further comprising a pedal displacement sensor configured to output an electrical signal corresponding to a displacement of the brake pedal,
wherein the hydraulic pressure supply device is activated by the electrical signal of the pedal displacement sensor.

11. The electronic brake system of claim 1,
wherein the hydraulic pressure supply device generates a hydraulic pressure by the piston activated by an output electrical signal corresponding to a displacement of the brake pedal and includes a first pressure chamber provided at one side of the piston, which is movably housed inside a cylinder block, and connected to one or more of the plurality of wheel cylinders, and a second pressure chamber provided at another side of the piston and connected to one or more of the plurality of wheel cylinders, and
wherein the electronic brake system further comprises: a first hydraulic flow path communicating with the first pressure chamber; second and third hydraulic flow paths branching from the first hydraulic flow path;
a first hydraulic circuit including a first branch flow path and a second branch flow path branching from the second hydraulic flow path, the first branch flow path connected to a first wheel cylinder of the plurality of wheel cylinders and the second branch flow path connected to a second wheel cylinder of the plurality of wheel cylinders; and
a second hydraulic circuit including third and fourth branch flow paths branching from the third hydraulic flow path, the third branch flow path connected to a third wheel cylinder of the plurality of wheel cylinders and the fourth branch flow path connected to a fourth wheel cylinder of the plurality of wheel cylinders.

12. The electronic brake system of claim 11,
wherein the plurality of inlet valves include first to fourth inlet valves installed in the first to fourth branch flow paths to selectively open and close brake fluid flow, and
wherein the first backup flow path connects the first master chamber to a downstream side of the first inlet valve, or the second backup flow path connects the second master chamber to a downstream side of the fourth inlet valve.

13. The electronic brake system of claim 11, further comprising:
a fourth hydraulic flow path communicating with the second pressure chamber;
a fifth hydraulic flow path branching from the fourth hydraulic flow path and joining the second hydraulic flow path; and
a sixth hydraulic flow path branching from the fourth hydraulic flow path and joining the third hydraulic flow path.

14. The electronic brake system of claim 1, further comprising:
a reservoir flow path configured to connect the reservoir to the master cylinder;
a bypass flow path bypassing the reservoir flow path; and an inspection valve configured to selectively open and close the bypass flow path.

15. An electronic brake system comprising:
a master cylinder connected to a reservoir in which brake fluid is stored and configured to discharge the brake fluid according to a pedal effort of a brake pedal, the master cylinder including first and second master chambers and first and second pistons provided in the master chambers;
a hydraulic pressure supply device activated by an electrical signal to generate a hydraulic pressure;
a hydraulic pressure control unit configured to transfer, to a plurality of wheel cylinders provided in wheels, a hydraulic pressure discharged from the hydraulic pressure supply device;
a first backup flow path configured to connect the first master chamber to the hydraulic pressure control unit;
a second backup flow path configured to connect the second master chamber to the hydraulic pressure control unit;
a first cut valve configured to selectively open and close the first backup flow path; and
a second cut valve configured to selectively open and close the second backup flow path,
wherein the first backup flow path is connected to one of the first or second master chambers and one or more of the plurality of wheel cylinders, and/or
wherein the second backup flow path is connected to the other of the first or second master chambers and a different one or more of the plurality of the wheel cylinders,
wherein the hydraulic pressure supply device includes a motor activated by an output electrical signal corresponding to a displacement of the brake pedal, a power converter configured to convert a rotational force of the motor into translational motion, a cylinder block, a piston connected to the power converter and movably housed inside the cylinder block, a first pressure chamber provided at one side of the piston and connected to the one or more of the plurality of wheel cylinders, and a second pressure chamber provided at another side of the piston and connected to the one or more of the plurality of wheel cylinders,
wherein a plurality of inlet valves include first to fourth inlet valves, and
wherein the electronic brake system further comprises:
a first hydraulic flow path communicating with the first pressure chamber and configured to provide a hydraulic pressure generated in the first pressure chamber to the one or more of the plurality of wheel cylinders;
a second hydraulic flow path communicating with the first pressure chamber and configured to provide a hydraulic pressure generated in the first pressure chamber to the different one or more of the plurality of wheel cylinders;
a third hydraulic flow path communicating with the second pressure chamber, joining the first hydraulic flow path, and configured to provide a hydraulic pressure generated in the second pressure chamber to the one or more of the plurality of wheel cylinders;
a fourth hydraulic flow path allowing the first hydraulic flow path to communicate with the second hydraulic flow path to transfer a hydraulic pressure of the one or more of the plurality of wheel cylinders to the first pressure chamber;
a fifth hydraulic flow path allowing the fourth hydraulic flow path to communicate with the first hydraulic flow path or the second hydraulic flow path to transfer a hydraulic pressure of the one or more of the plurality of wheel cylinders to the first pressure chamber;
a first control valve provided in the first hydraulic flow path and configured to control brake fluid flow;
a second control valve provided in the second hydraulic flow path and configured to control brake fluid flow;
a third control valve provided in the third hydraulic flow path and configured to control brake fluid flow;
a fifth control valve provided in the fourth hydraulic flow path or the fifth hydraulic flow path and configured to control brake fluid flow;
a first hydraulic circuit including first and second branch flow paths branching from the first hydraulic flow path and connecting to two wheel cylinders of the plurality of wheel cylinders, and the first and second inlet valves configured to control the first and second branch flow paths;
a second hydraulic circuit including third and fourth branch flow paths branching from the second hydraulic flow path and connecting to two other wheel cylinders of the plurality of wheel cylinders; and
an electronic control unit (ECU) configured to control operation of the motor and control operation of the fifth control valve and the first to fourth inlet valves.

16. The electronic brake system of claim 15, further comprising:
a sixth hydraulic flow path communicating with the second pressure chamber, joining the second hydraulic flow path, and configured to provide the hydraulic pressure generated in the second pressure chamber to the one or more of the plurality of wheel cylinders; and
a fourth control valve provided in the sixth hydraulic flow path and configured to control brake fluid flow.

* * * * *